United States Patent
Kohno

[11] Patent Number: 5,999,334
[45] Date of Patent: Dec. 7, 1999

[54] FIXED FOCAL LENGTH LENS SYSTEM

[75] Inventor: Tetsuo Kohno, Toyonaka, Japan

[73] Assignee: Minolta Co., Ltd., Osaka, Japan

[21] Appl. No.: 09/006,342

[22] Filed: Jan. 13, 1998

[30] Foreign Application Priority Data

Jan. 14, 1997 [JP] Japan ................................ 9-004273
Jan. 22, 1997 [JP] Japan ................................ 9-009449

[51] Int. Cl.$^6$ ............................. G02B 17/00; G02B 9/00
[52] U.S. Cl. ...................... 359/736; 359/733; 359/739
[58] Field of Search .................................. 359/736, 733, 359/734, 735, 739, 793

[56] References Cited

U.S. PATENT DOCUMENTS

| | | | |
|---|---|---|---|
| 3,999,840 | 12/1976 | Momiyama | 350/214 |
| 4,093,348 | 6/1978 | Yasukuni | 350/206 |
| 5,589,988 | 12/1996 | Suenaga | 359/752 |
| 5,619,380 | 4/1997 | Ogasawara et al. | 359/661 |
| 5,629,799 | 5/1997 | Maruyama et al. | 359/565 |

FOREIGN PATENT DOCUMENTS

| | | |
|---|---|---|
| 1-128025 | 5/1989 | Japan . |
| 1-307712 | 12/1989 | Japan . |
| 2-073210 | 3/1990 | Japan . |
| 4-349418 | 12/1992 | Japan . |
| 5-341185 | 12/1993 | Japan . |
| 6-242373 | 9/1994 | Japan . |
| 6-324262 | 11/1994 | Japan . |

*Primary Examiner*—Georgia Epps
*Assistant Examiner*—Suzanne Letendre
*Attorney, Agent, or Firm*—Sidley & Austin

[57] ABSTRACT

A lens system has the first and second lens components from the object side. The first lens component has a negative optical power. The second lens component has a positive optical power. The lens system fulfills the conditions: $0.0<PR_L/Y'<0.5$, $0.5<Pf/f<1.0$. In the conditions, $PR_L$ represents a distance in a direction perpendicular to the optical axis between the optical axis and an incident position where a lower ray of a most off-axial rays enters said second lens component, Y' represents a largest image height, f represents a focal length of the entire lens system, and Pf represents a focal length of said second lens component.

16 Claims, 13 Drawing Sheets

FIG. 3
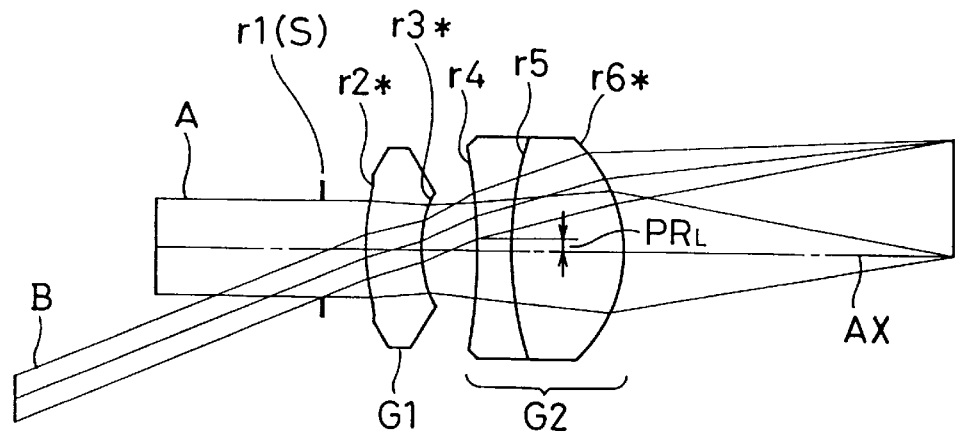
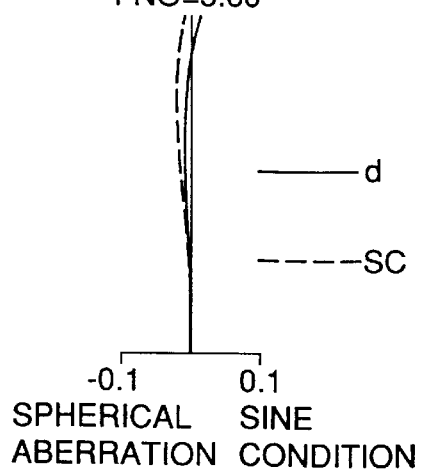
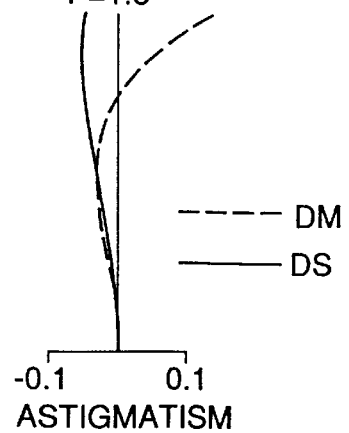
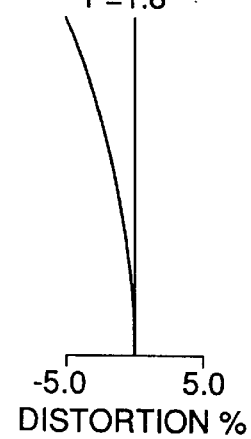

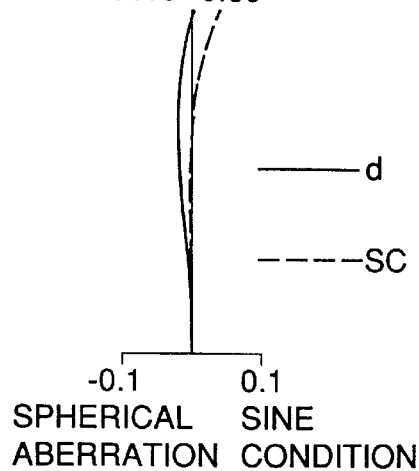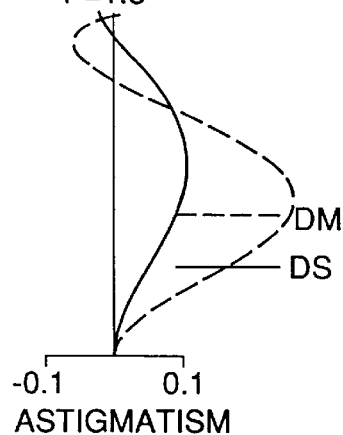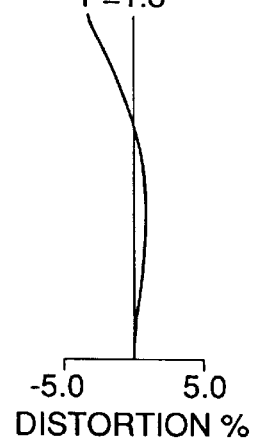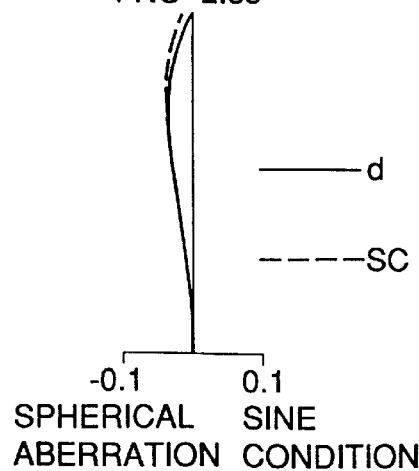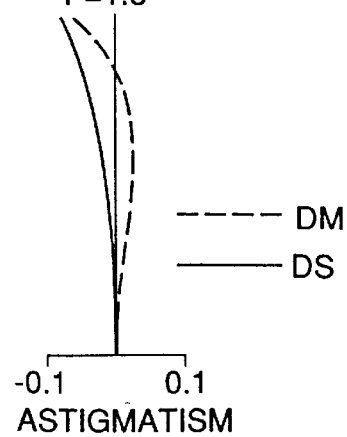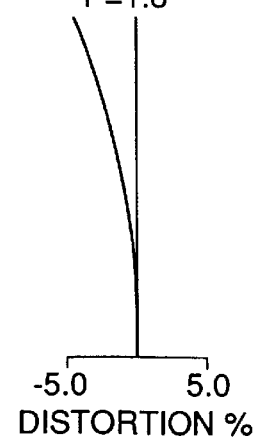

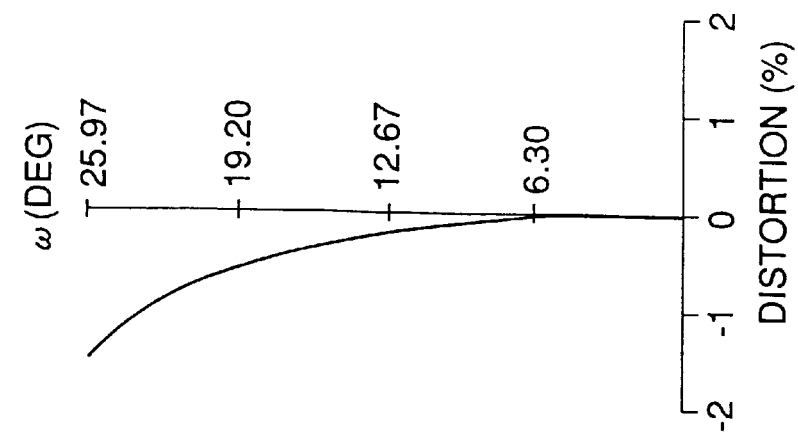
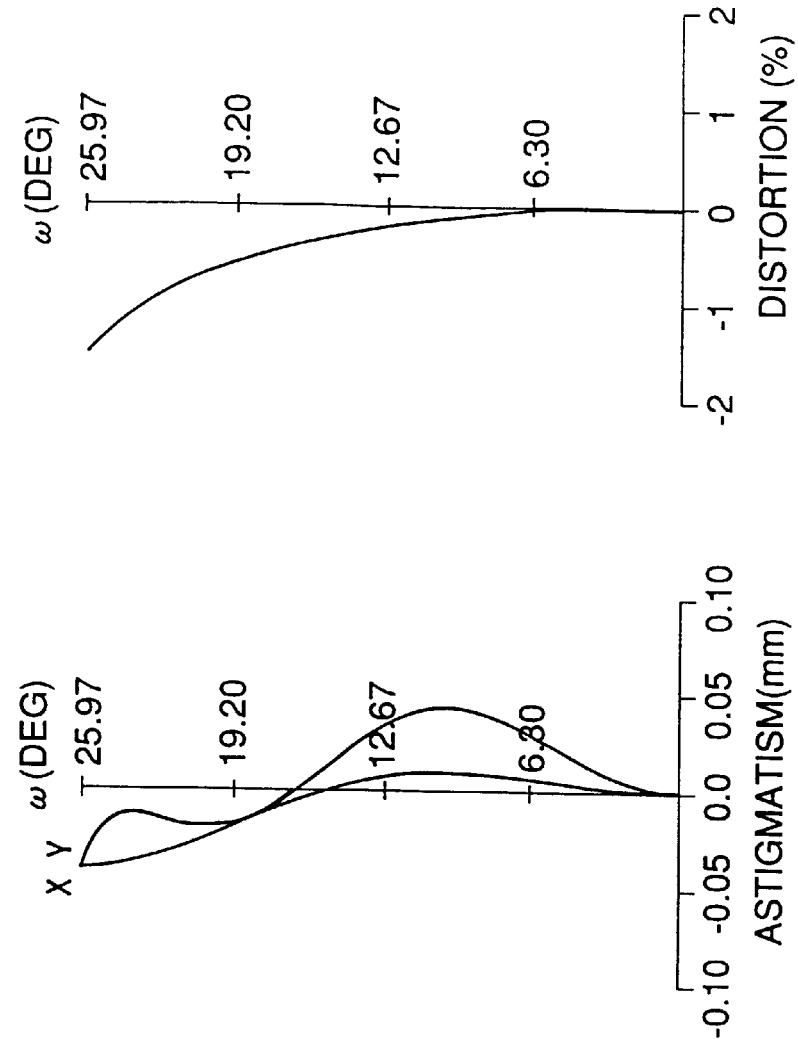
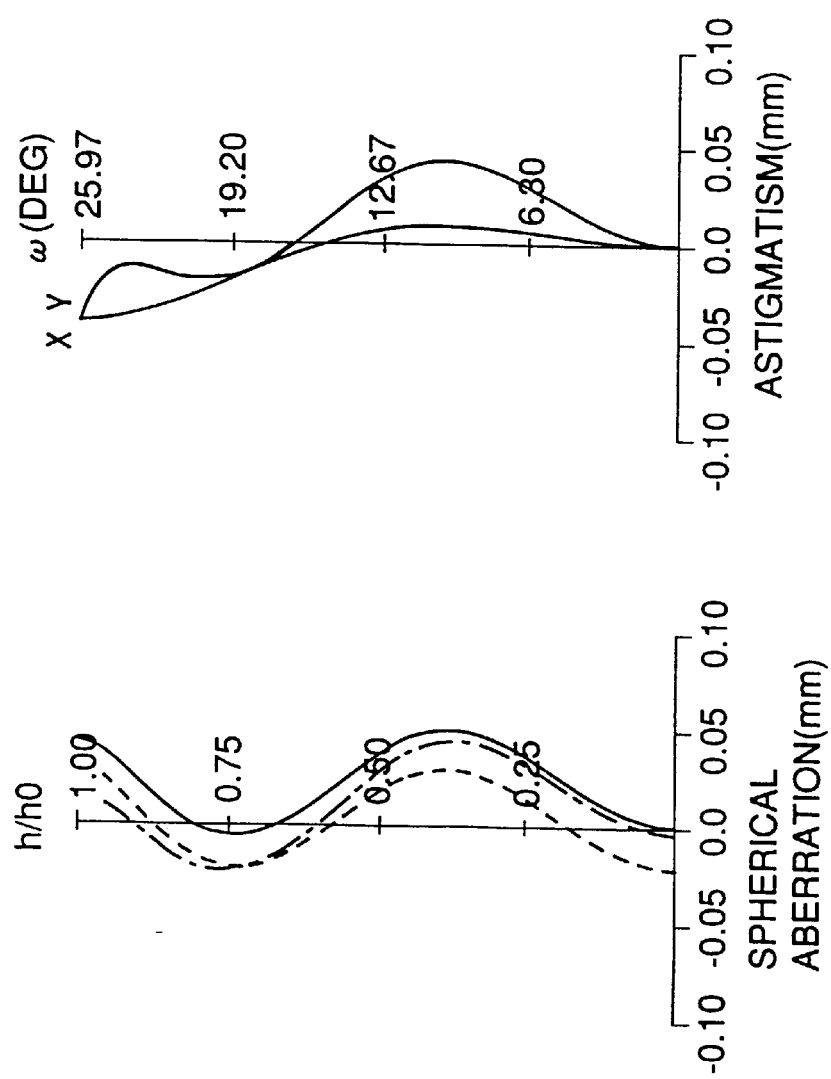

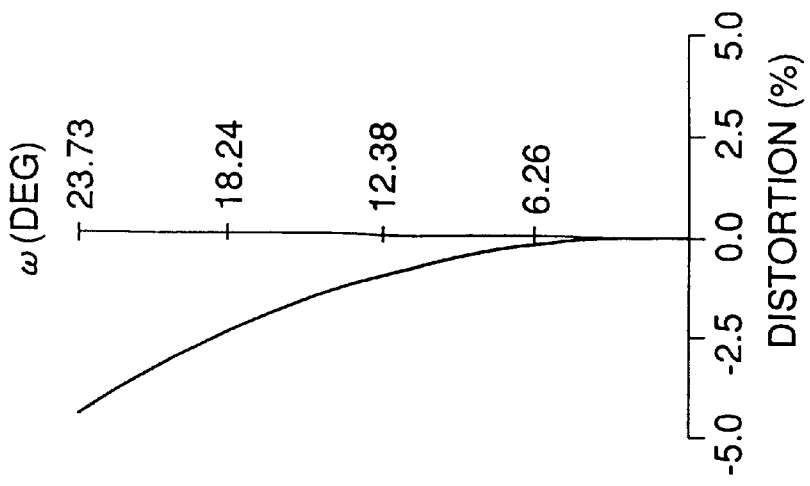
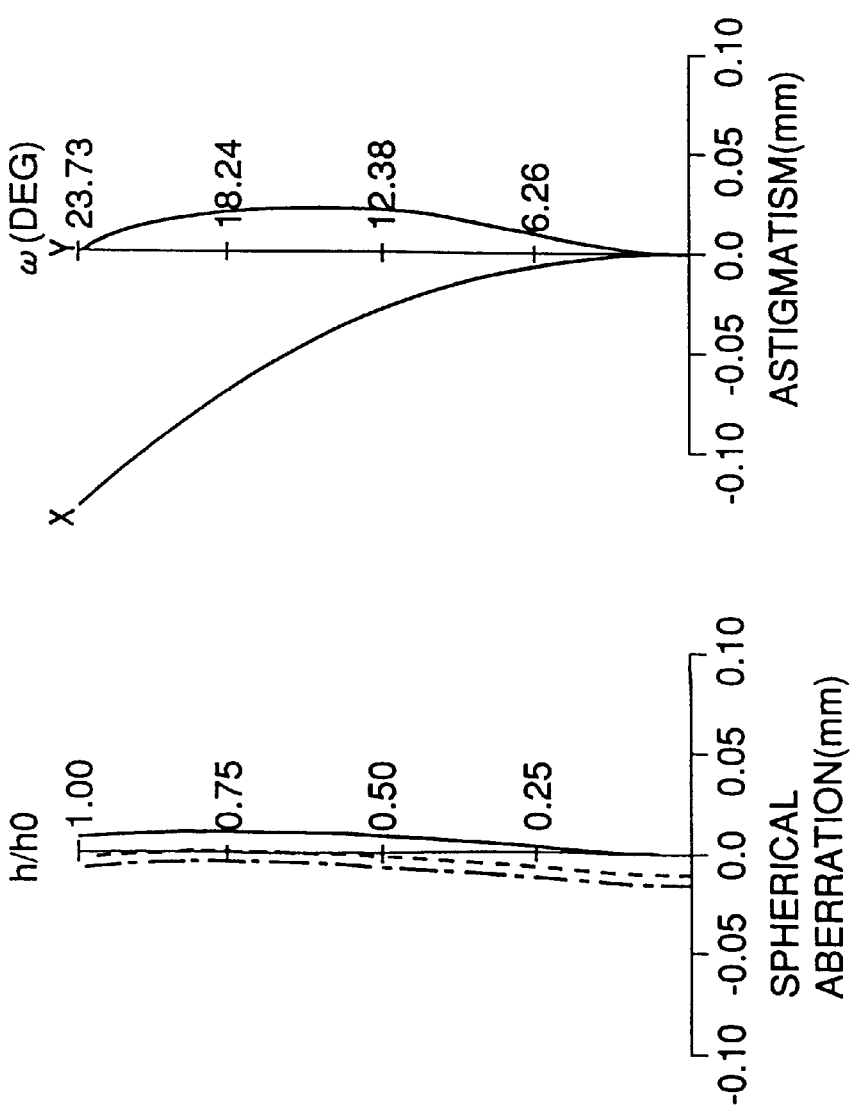

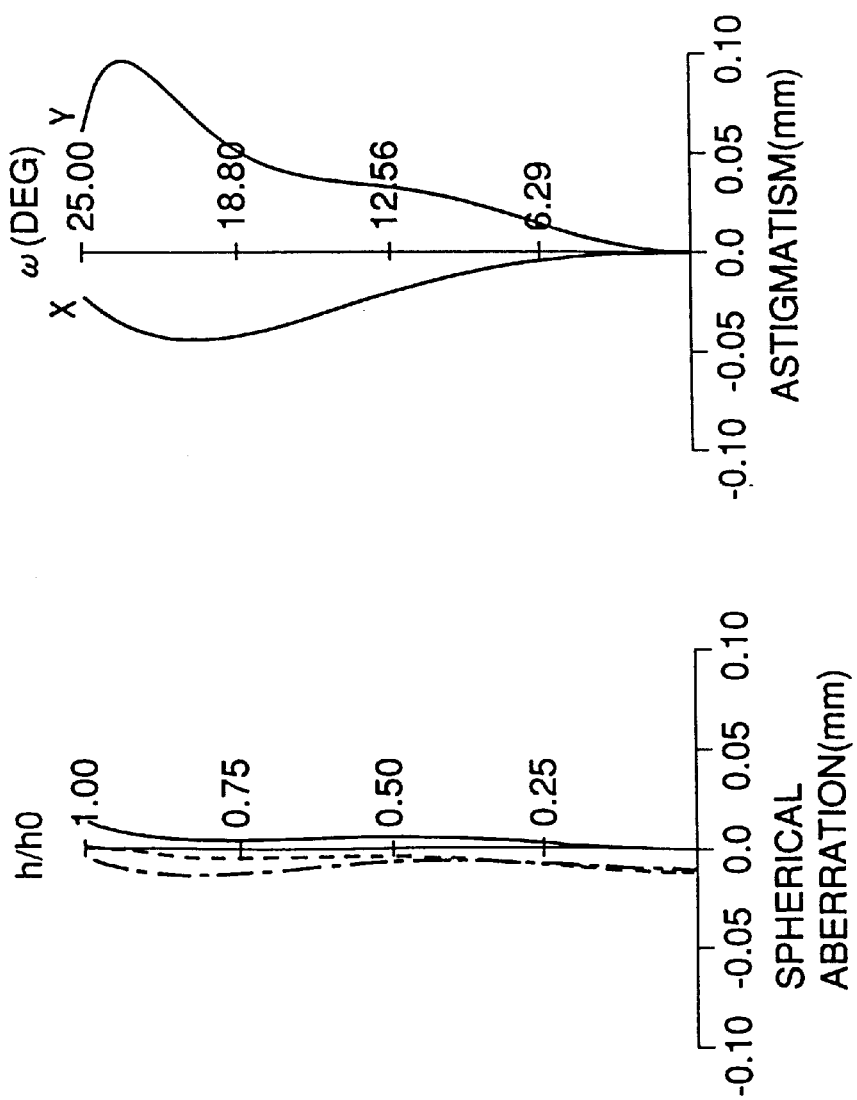
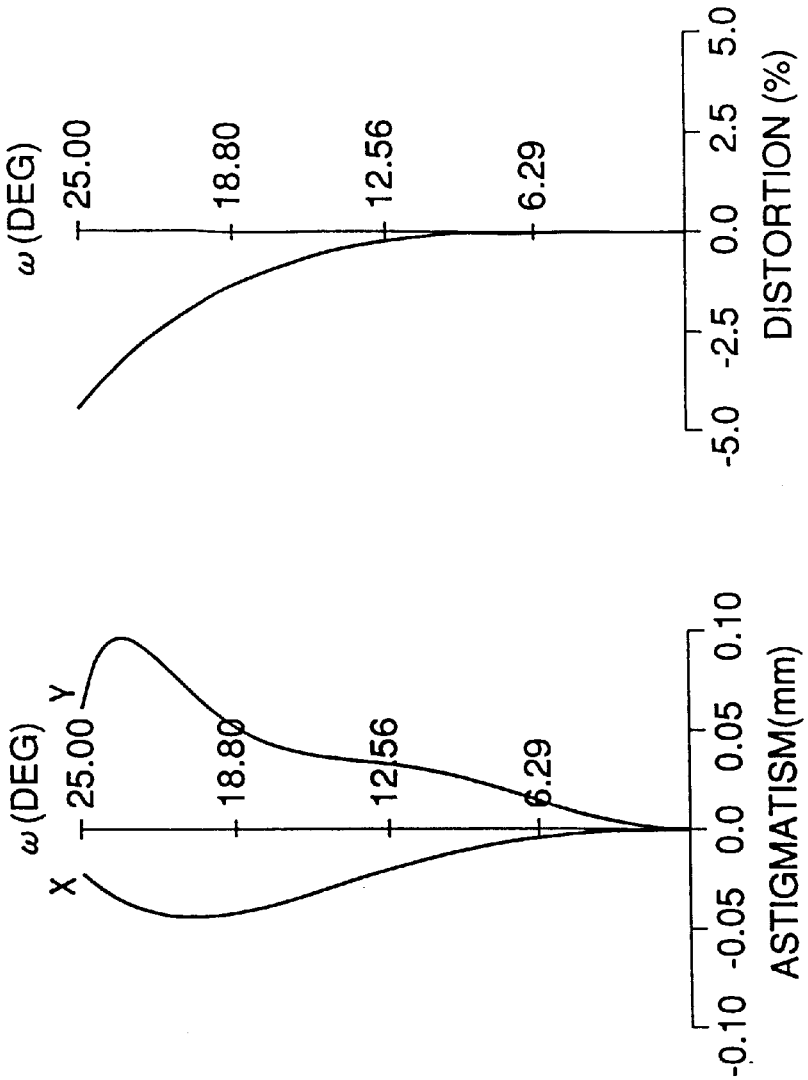
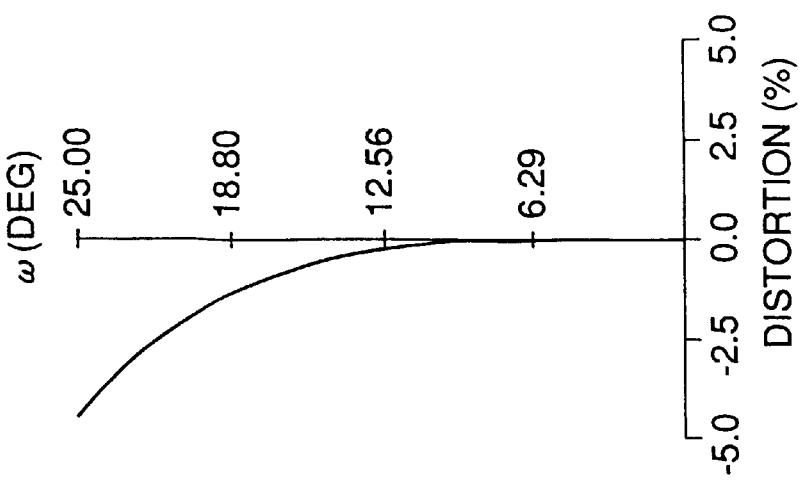

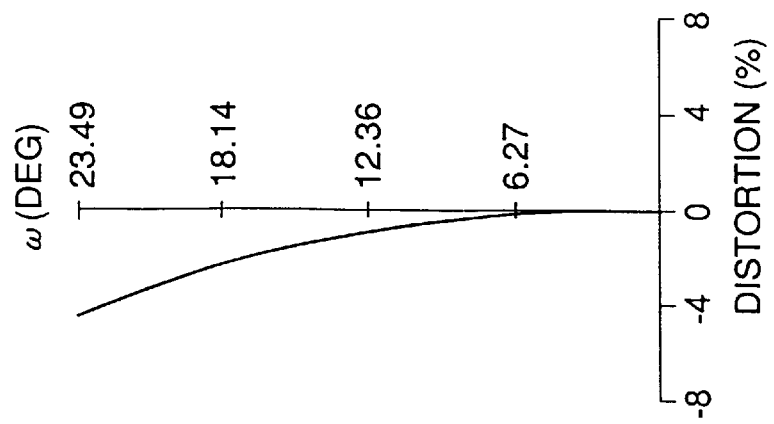
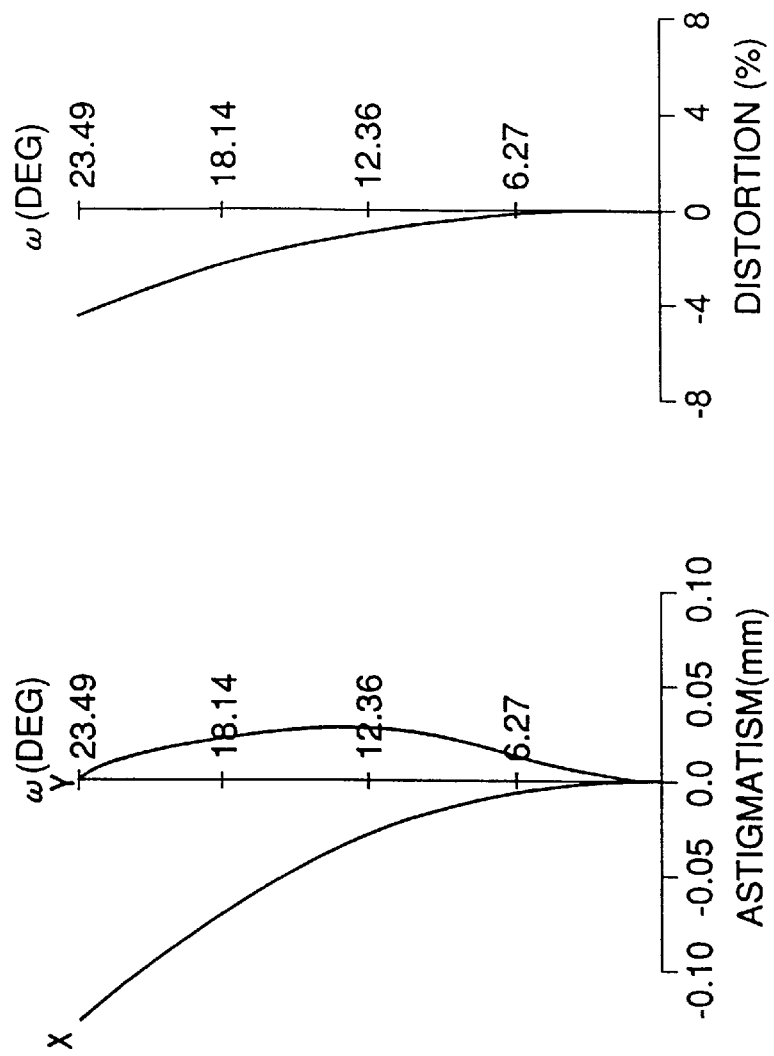
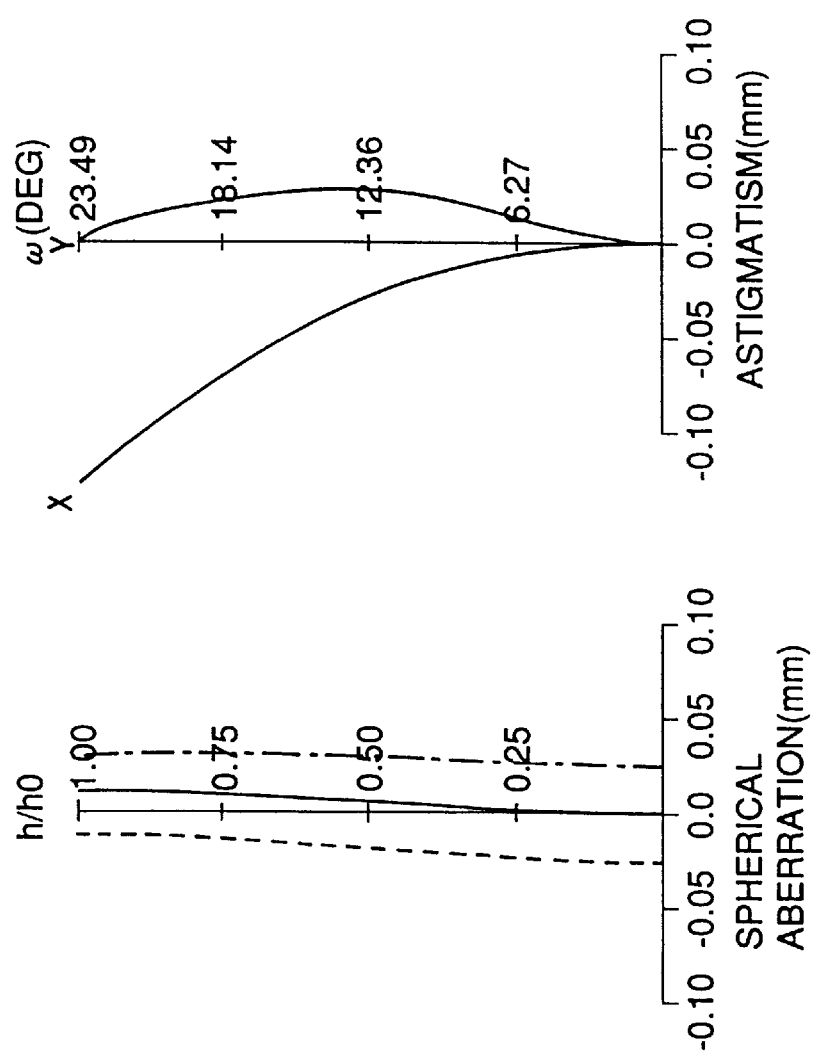

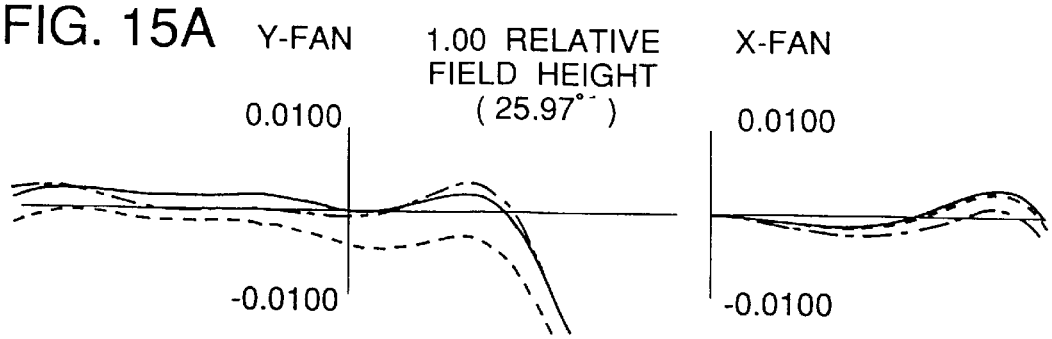
FIG. 15A  Y-FAN  1.00 RELATIVE FIELD HEIGHT (25.97°)  X-FAN
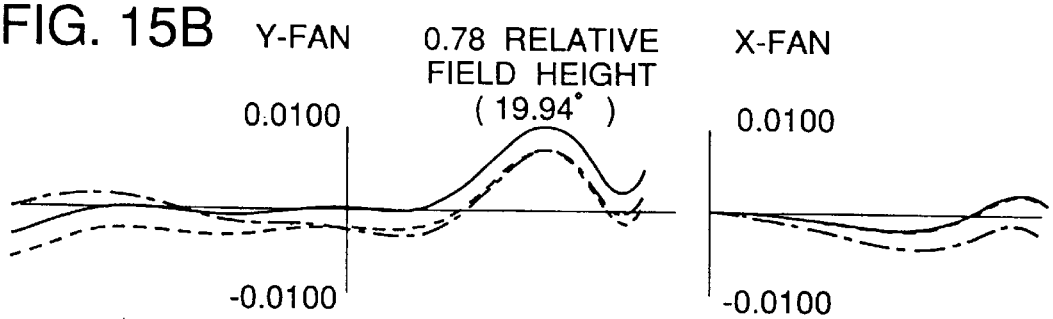
FIG. 15B  Y-FAN  0.78 RELATIVE FIELD HEIGHT (19.94°)  X-FAN
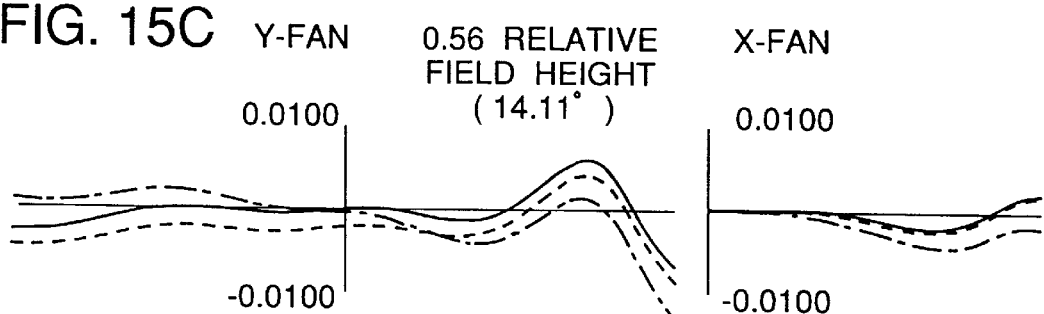
FIG. 15C  Y-FAN  0.56 RELATIVE FIELD HEIGHT (14.11°)  X-FAN
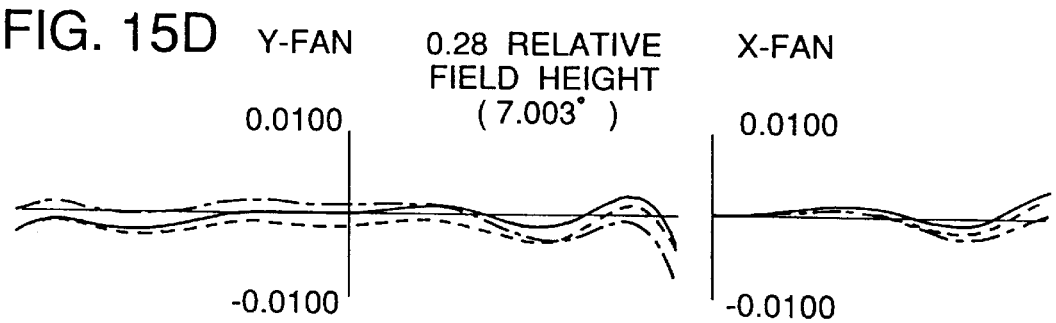
FIG. 15D  Y-FAN  0.28 RELATIVE FIELD HEIGHT (7.003°)  X-FAN
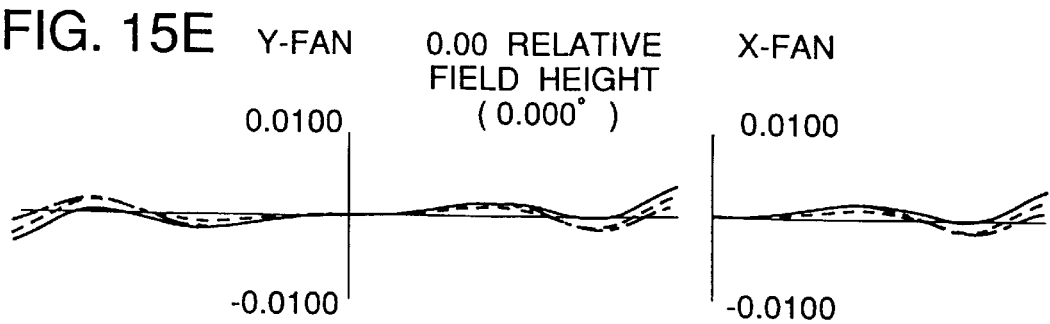
FIG. 15E  Y-FAN  0.00 RELATIVE FIELD HEIGHT (0.000°)  X-FAN

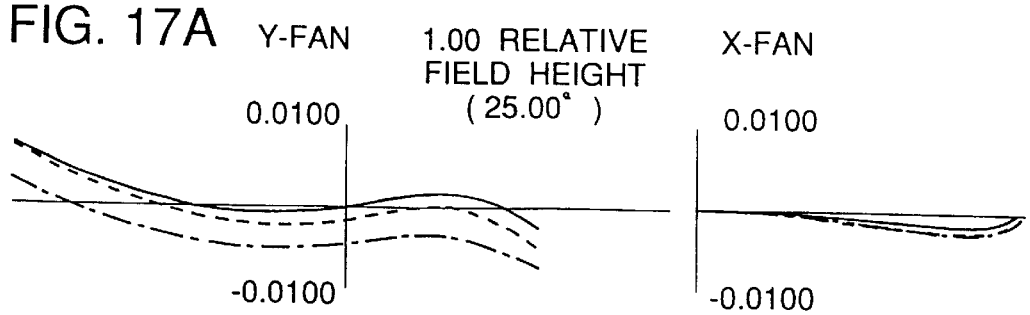
FIG. 17A  1.00 RELATIVE FIELD HEIGHT (25.00°)
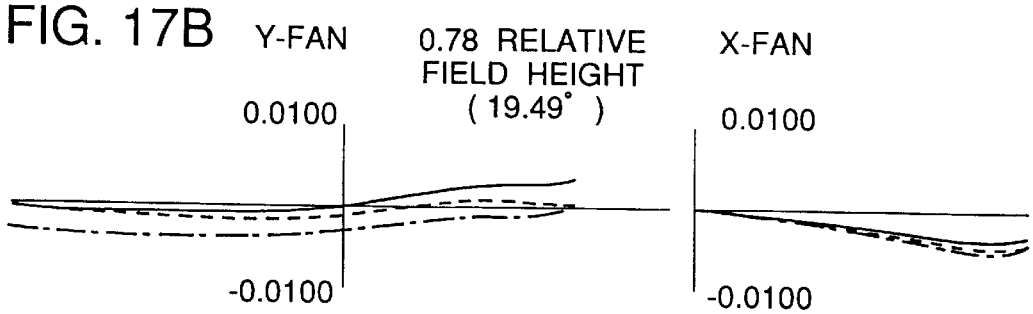
FIG. 17B  0.78 RELATIVE FIELD HEIGHT (19.49°)
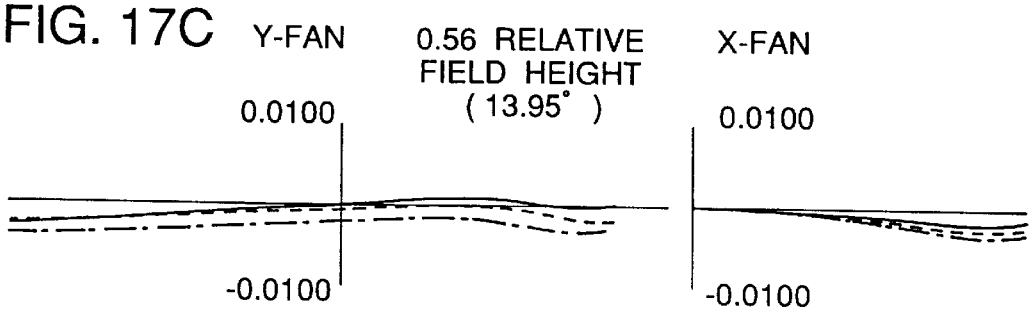
FIG. 17C  0.56 RELATIVE FIELD HEIGHT (13.95°)
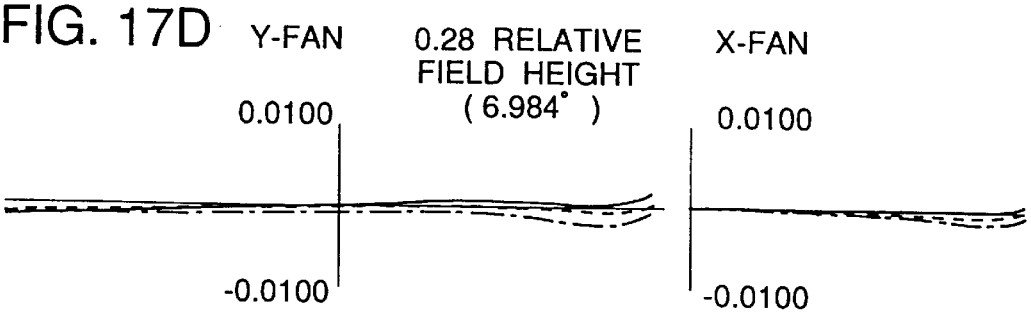
FIG. 17D  0.28 RELATIVE FIELD HEIGHT (6.984°)
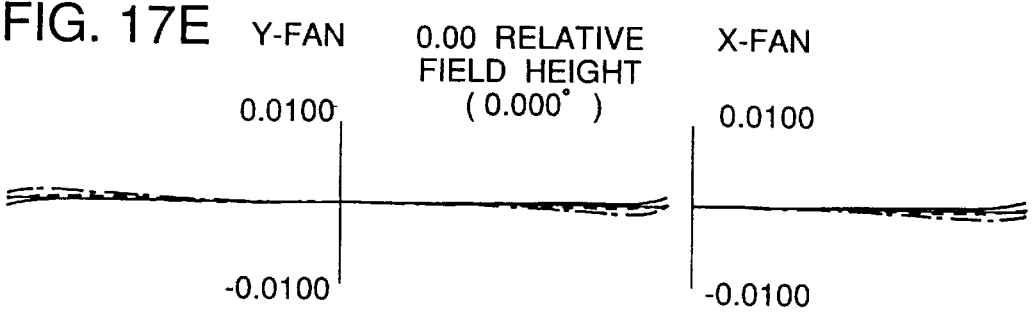
FIG. 17E  0.00 RELATIVE FIELD HEIGHT (0.000°)

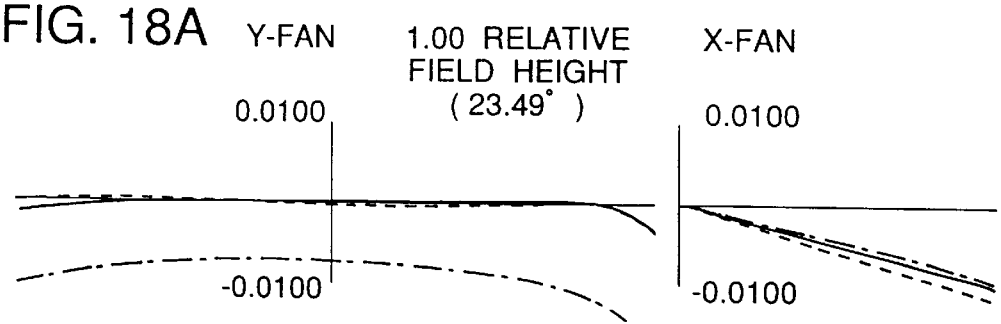
FIG. 18A  Y-FAN  1.00 RELATIVE FIELD HEIGHT (23.49°)  X-FAN
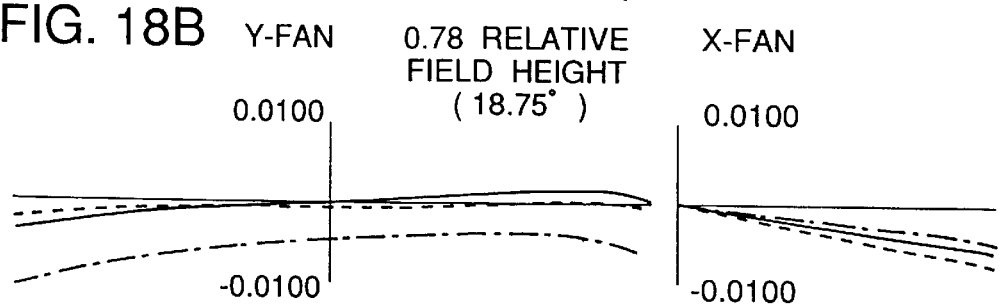
FIG. 18B  Y-FAN  0.78 RELATIVE FIELD HEIGHT (18.75°)  X-FAN
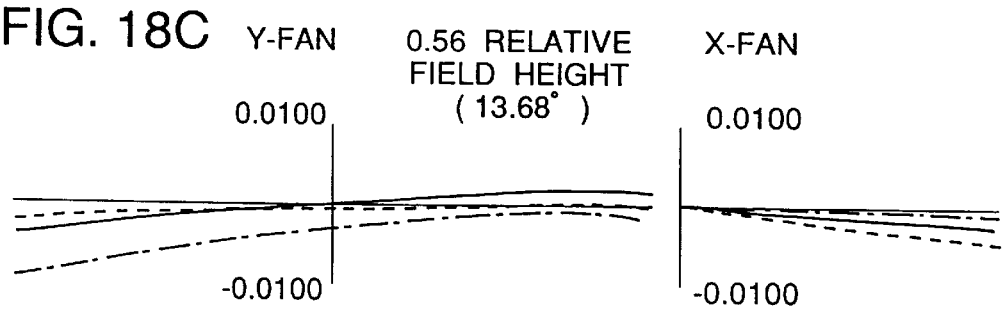
FIG. 18C  Y-FAN  0.56 RELATIVE FIELD HEIGHT (13.68°)  X-FAN
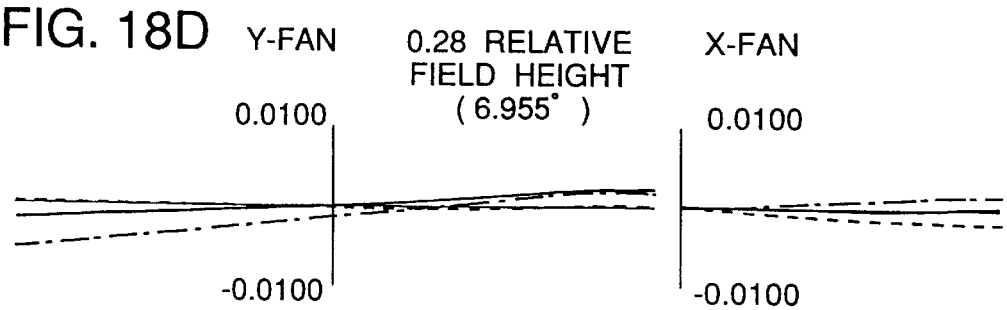
FIG. 18D  Y-FAN  0.28 RELATIVE FIELD HEIGHT (6.955°)  X-FAN
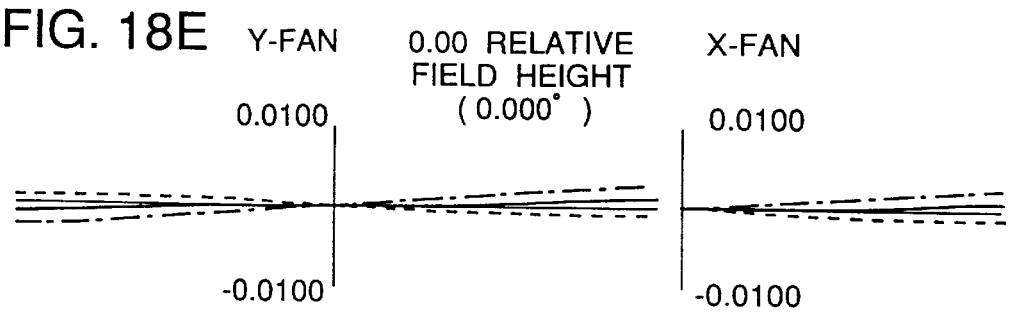
FIG. 18E  Y-FAN  0.00 RELATIVE FIELD HEIGHT (0.000°)  X-FAN

FIXED FOCAL LENGTH LENS SYSTEM

This application is based on applications Nos. H9-004273 and H9-009449 filed in Japan, the contents of which are hereby incorporated by reference.

BACKGROUND OF THE INVENTION

1. Field of the Invention

The present invention relates to a fixed focal length lens system, and more particularly to a fixed focal length lens system consisting of as few lens components as possible and suitable for use in a camera based on a solid-state image-sensing device.

2. Description of the Prior Art

In recent years, miniaturization and cost reduction have been eagerly sought in cameras (for example, video cameras and television cameras) of the type that produces an image of an object by receiving light rays incoming through a taking lens system by means of a solid-state image-sensing device (for example, a charge-coupled device (CCD)) composed of an array of photosensitive components. As a natural consequence of this trend, miniaturization and cost reduction have been sought also in taking lens systems for use in such cameras.

Miniaturization and cost reduction in taking lens systems can most effectively be achieved by reducing the number of the constituent lens components. In fact, up to date, various taking lens systems have been proposed that consist of as few lens components as possible. For example, Japanese Laid-open Patent Applications Nos. H1-307712, H2-73210, H4-349418, and others propose fixed focal length taking lens systems in which miniaturization and cost reduction are achieved by reducing the number of the constituent lens components. Moreover, Japanese Laid-open Patent Application No. H5-341185 proposes an objective optical system consisting of two lens components for use in an endoscope.

On the other hand, in recent years, much attention has been given to the fact that a combination of a diffractive optical component and a refractive optical component effectively corrects chromatic, spherical, and other aberrations. In fact, up to date, various optical systems have been proposed that employ such combinations of optical elements. For example, Japanese Laid-open Patent Application No. H6-324262 proposes a taking lens system based on this principle, and Japanese Laid-open Patent Application No. H6-242373 proposes an objective lens based on the same principle for use in an optical disk system.

In a camera based on a solid-state image-sensing device as mentioned above, a condensing microlens is provided on the incident-surface side of each photosensitive component in the image-sensing device to enhance the light reception efficiency of the photosensitive component. To maximize the light condensing ability of such a condensing microlens, it is desirable that light rays entering the microlens be parallel to the optical axis of the microlens (that is, even off-axial light rays entering the microlens be perpendicular to the incident surface of the corresponding photosensitive component).

The light condensing ability of the microlens is maximized by placing the exit pupil of the taking lens system substantially at infinity (that is, by designing the taking lens system to be substantially telecentric toward the image side), because, then, off-axial light rays entering the microlens are substantially perpendicular to the incident surface of the corresponding photosensitive component. By contrast, if the exit pupil of the taking lens system is placed closer to the image plane, off-axial light rays entering those microlenses which are situated at the edges of the image formed on the solid-state image-sensing device form oblique angles with the incident surfaces of the corresponding photosensitive components, with the result that the light condensing ability of the microlenses weakens at the edges of the image. This leads to uneven brightness between the central and peripheral portions of the image. An optical system that is designed, for the above-stated reason, to be substantially telecentric toward the image side is proposed, for example, in Japanese Laid-open Patent Application No. H1-128025 and others in the form of a fixed focal length taking lens system for use in a video camera.

However, the fixed focal length taking lens system designed to be substantially telecentric as proposed in Japanese Laid-open Patent Application No. H1-128025 and others requires four or more lens elements, and therefore it is difficult to achieve further miniaturization and cost reduction in it. The fixed focal length taking lens systems as proposed in Japanese Laid-open Patent Applications Nos. H1-307712, H2-73210, H4-349418, and others are not designed to be substantially telecentric, and therefore the microlenses in solid-state image-sensing device used with them exhibit poor light condensing ability, causing uneven brightness between the central and peripheral portions of the image as mentioned above. In addition, these taking lens systems do not offer satisfactory optical performance in terms of correction of aberrations, in particular chromatic aberration. The objective optical system proposed in Japanese Laid-open Patent Application No. H5-341185 does not offer satisfactory optical performance when employed as a taking lens system in a camera based on a solid-state image-sensing device. The taking lens system proposed in Japanese Laid-open Patent Application No. H6-324262 requires as many as five or more lens components, and the objective lens proposed in Japanese Laid-open Patent Application No. H6-242373 does not offer satisfactory optical performance when employed as a taking lens system in a camera based on a solid-state image-sensing device.

SUMMARY OF THE INVENTION

An object of the present invention is to provide a fixed focal length lens system consisting of as few lens components as possible and having satisfactory optical performance for use as a taking lens system in a camera based on a solid-state image-sensing device.

To achieve the above object, according to one aspect of the present invention, a lens system is provided with, from the object side, a first lens element having a negative optical power and a second lens component having a positive optical power. In addition, the lens system fulfills the following conditions:

$$0.0 < PR_L/Y' < 0.5$$

$$0.5 < Pf/f < 1.0$$

where $PR_L$ represents the distance in a direction perpendicular to the optical axis between the optical axis and the incident position where the lower ray of the most off-axial rays enters the second lens component, Y' represents the largest image height, f represents the focal length of the entire lens system, and Pf represents the focal length of the second lens component.

According to another aspect to the present invention, a lens system is provided with, from the object side, a first lens component, a second lens component having a positive optical power, and a surface having an optical power of diffraction and provided in at least either of the first and second lens units. In addition, the lens system fulfills the following conditions:

$$0.01 < |\phi r/\phi A| < 0.45$$

$$f2/f1 < 0.6$$

where $\phi A$ represents the composite optical power of the entire lens system, $\phi r$ represents the optical power of diffraction of the surface, f1 represents the focal length of the first lens component, and f2 represents the focal length of the second lens component.

BRIEF DESCRIPTION OF THE DRAWINGS

This and other objects and features of this invention will become clear from the following description, taken in conjunction with the preferred embodiments with reference to the accompanied drawings in which:

FIG. 3 is a diagram showing the lens arrangement and optical paths of the fixed focal length lens system of a third embodiment of the invention;

FIGS. 4A to 4C are diagrams showing the aberrations observed in the fixed focal length lens system of the first embodiment;

FIGS. 5A to 5B are diagrams showing the aberrations observed in the fixed focal length lens system of the second embodiment;

FIGS. 6A to 6C are diagrams showing the aberrations observed in the fixed focal length lens system of the third embodiment;

FIGS. 11A to 11C are diagrams showing the longitudinal aberrations observed in the fixed focal length lens system of the fourth embodiment;

FIGS. 12A to 12C are diagrams showing the longitudinal aberrations observed in the fixed focal length lens system of the fifth embodiment;

FIGS. 13A to 13C are diagrams showing the longitudinal aberrations observed in the fixed focal length lens system of the sixth embodiment;

FIGS. 14A to 14C are diagrams showing the longitudinal aberrations observed in the fixed focal length lens system of the seventh embodiment;

FIGS. 15A to 15E are diagrams showing the lateral aberrations observed in the fixed focal length lens system of the fourth embodiment;

FIGS. 17A to 17E are diagrams showing the lateral aberrations observed in the fixed focal length lens system of the sixth embodiment; and FIGS. 18A to 18E are diagrams showing the lateral aberrations observed in the fixed focal length lens system of the seventh embodiment.

DESCRIPTION OF THE PREFERRED EMBODIMENTS

Hereinafter, fixed focal length lens systems embodying the present invention will be described with reference to the drawings.

<Embodiments 1 to 3>

Figure 1:
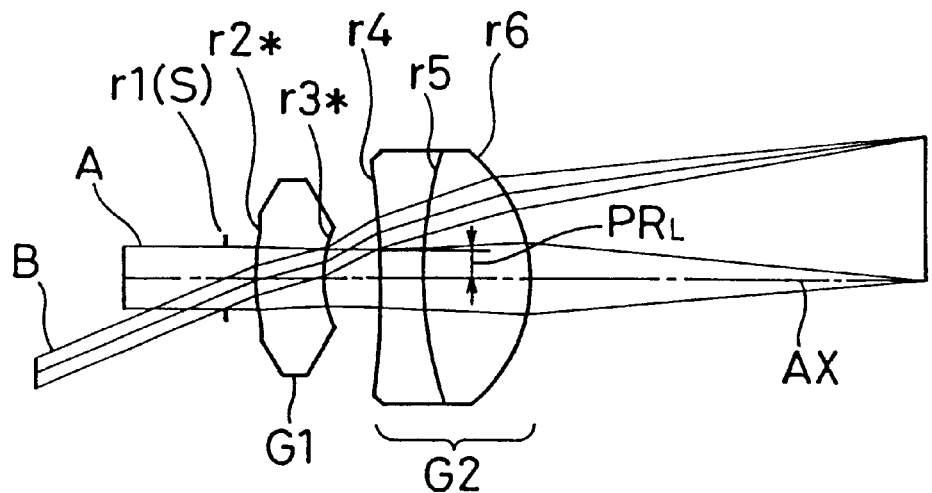
FIG. 1 is a diagram showing the lens arrangement and optical paths of the fixed focal length lens system of a first embodiment of the invention.
Figure 2:
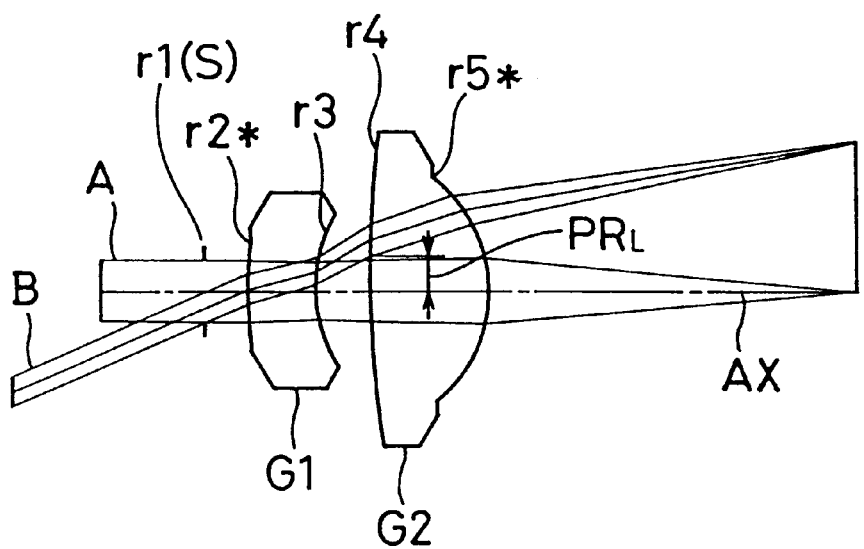
FIG. 2 is a diagram showing the lens arrangement and optical paths of the fixed focal length lens system of a second embodiment of the invention.
Figure 7:
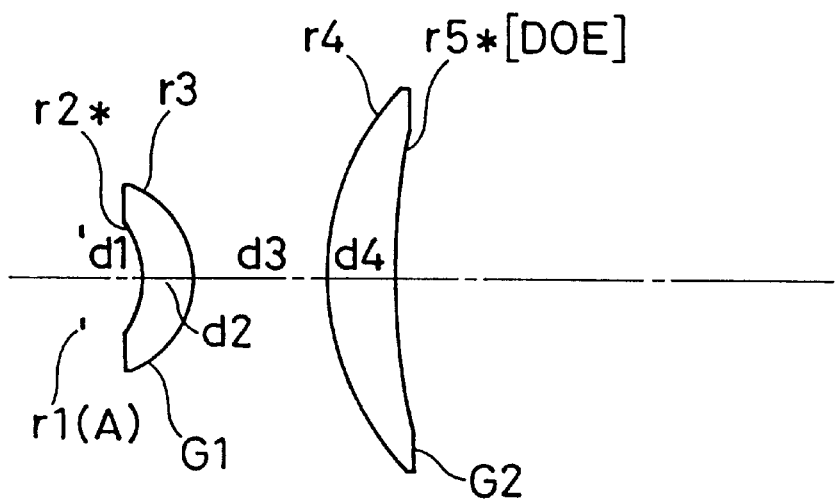
FIG. 7 is a diagram showing the lens arrangement of the fixed focal length lens system of a fourth embodiment of the invention.
Figure 8:
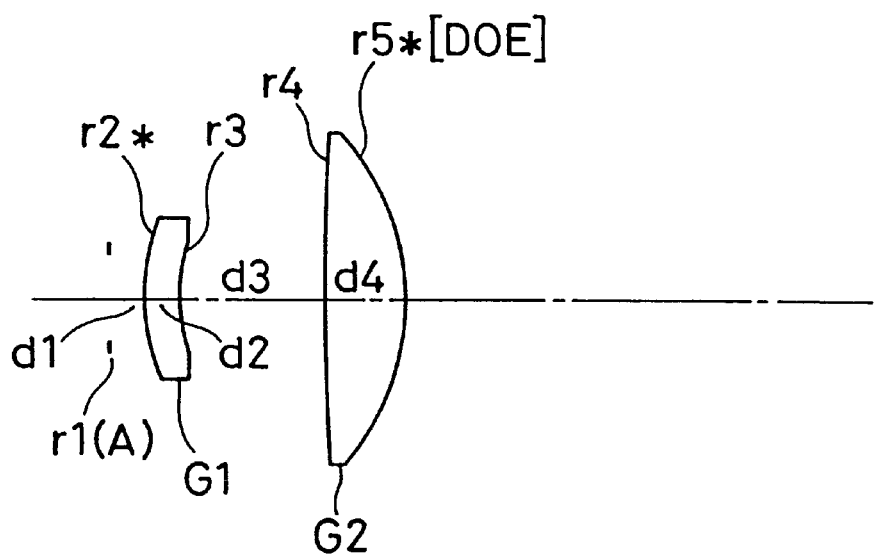
FIG. 8 is a diagram showing the lens arrangement of the fixed focal length lens system of a fifth embodiment of the invention.
Figure 9:
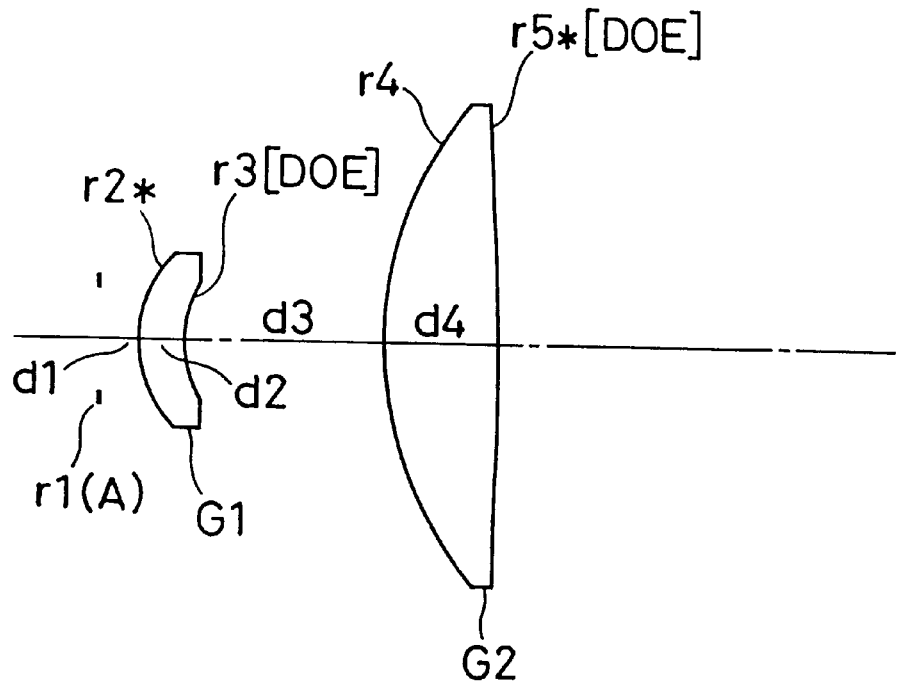
FIG. 9 is a diagram showing the lens arrangement of the fixed focal length lens system of a sixth embodiment of the invention.
Figure 10:
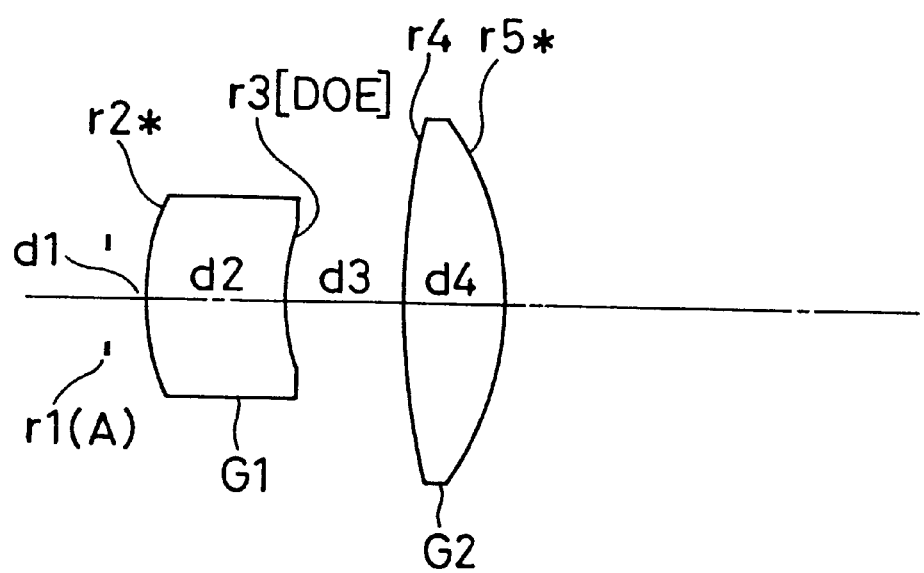
FIG. 10 is a diagram showing the lens arrangement of the fixed focal length lens system of a seventh embodiment of the invention.
Figure 16A:
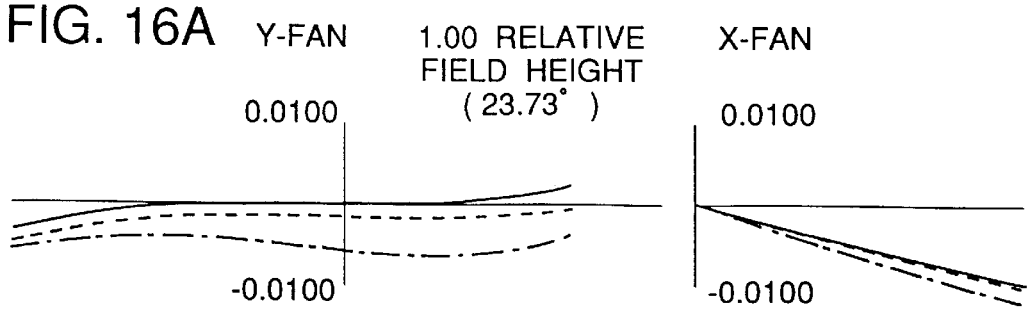
FIGS. 16A to 16E are diagrams showing the lateral aberrations observed in the fixed focal length lens system of the fifth embodiment.
Figure 16B:
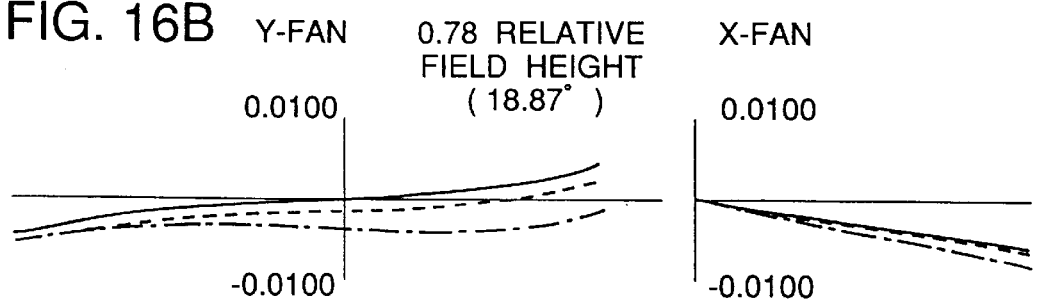
Figure 16C:
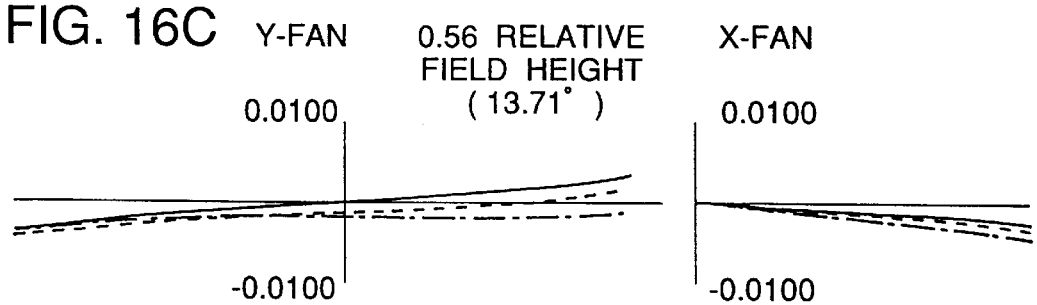
Figure 16D:
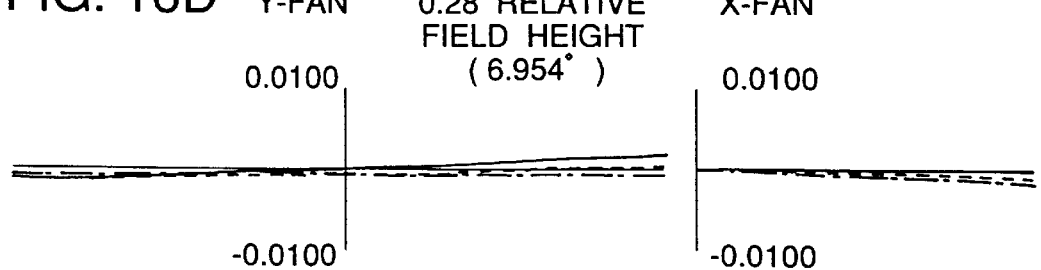
Figure 16E:
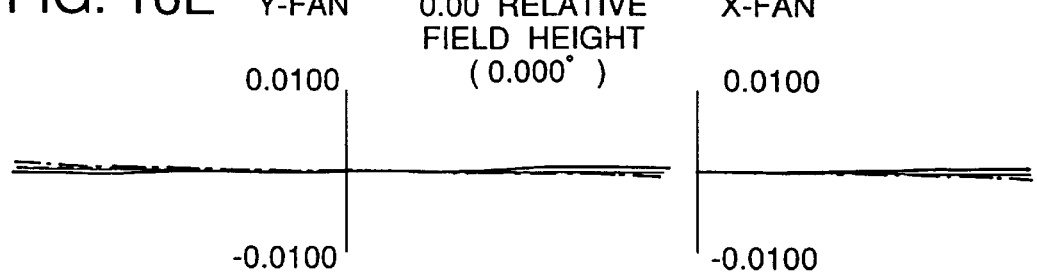

FIGS. 1, 2, and 3 show the lens arrangement of the fixed focal length lens system of a first, a second, and a third embodiment, respectively, of the invention. In these lens arrangement diagrams, ri (i=1, 2, 3, . . . ) represents the ith surface from the object side, and an asterisk (*) attached to an ri indicates that the surface is an aspherical surface; the letter A indicates the optical paths of axial light rays, and the letter B indicates the optical paths of most off-axial light rays.

The fixed focal length lens systems of the first to third embodiments are all intended for image formation on a solid-state image-sensing device, and are each constituted of, from the object side, an aperture diaphragm S, a first lens component G1 having a negative optical power, and a second lens component G2 having a positive optical power. In the first embodiment (FIG. 1), the first lens component G1 is composed of a negative meniscus lens component convex to the object side, and the second lens component G2 is composed of a doublet lens component formed by cementing together, from the object side, a negative biconcave lens component and a positive biconvex lens element. In the second embodiment (FIG. 2), the first lens component G1 is composed of a negative meniscus lens component convex to the object side, and the second lens element G2 is composed of a positive biconvex lens element. In the third embodiment (FIG. 3), the first lens component G1 is composed of a negative meniscus lens element convex to the object side, and the second lens component G2 is composed of a doublet lens component formed by cementing together, from the object side, a negative biconcave lens element and a positive biconvex lens element.

In the first to third embodiments, a retrofocus-type lens arrangement is adopted to secure a relatively long back focal distance. A sufficiently long back focal distance makes it easy to place the exit pupil far enough, and makes it possible to provide a low-pass filter between the lens system and the solid-state image-sensing device to reduce false signals.

In the first to third embodiments, the following conditions (1) and (2) are fulfilled:

$$0.0 < PR_L/Y' < 0.5 \quad (1)$$

$$0.5 < Pf/f < 1.0 \quad (2)$$

where $PR_L$ represents the distance in a direction perpendicular to the optical axis between the optical axis and the incident position where the lower ray of the most off-axial rays enters the second lens component G2, that is, the indent height of the lower ray, Y' represents the largest image height, f represents the focal length of the entire lens system, and Pf represents the focal length of the second lens component G2.

Conditions (1) and (2) relate to the second lens component G2 that plays the key roll in the fixed focal length lens systems of the invention. Of the off-axial light rays that enter the microlenses, the one that forms the largest incident angle is called the lower ray. Condition (1) defines the ratio of the incident height $PR_L$ (see FIGS. 1 to 3) at which the lower ray enters the second lens component G2, as measured from the optical axis AX, to the largest image height Y'. As long as condition (1) is fulfilled, a good balance is achieved between the telecentricity and the aberration correction performance of the lens system. Note that the incident height $PR_L$ is positive when the lower ray enters the second lens component G2 at a position above the optical axis AX and is negative when it does so at a position below the optical axis AX.

When the lower limit of the condition (1) is exceeded, since the incident height $PR_L$ is too low, a desired degree of telecentricity cannot be fulfilled, so that the lower ray is obliquely incident. When the upper limit of the condition (1) is exceeded, the incident height $PR_L$ is too high, so that although this is advantageous in obtaining a desired degree of telecentricity, aberrations (particularly, curvature of field and distortion) degrade.

The condition (2) defines the ratio between the focal length Pf of the second lens component G2 and the focal length f of the entire lens system. When the lower limit of the condition (2) is exceeded, the optical power of the second lens component G2 is too strong, so that aberrations (particularly, negative distortion and lateral chromatic aberration) of the off-axial light rays degrade. When the upper limit of the condition (2) is exceeded, the optical power of the second lens component G2 is too weak, so that curvature of field markedly inclines toward the over side.

Since the embodiments are constructed as described above, the principal ray of the off-axial light rays is substantially parallel to the optical axis AX so that a substantially telecentric condition is obtained and excellent aberration correction is realized although the number of lens components is small. By further fulfilling the following condition (3), a fixed focal length lens system is obtained which has more excellent performance:

$$-0.6 < Pf/Nf < -0.1 \tag{3}$$

where

Nf represents the focal length of the first lens component G1.

The condition (3) defines the ratio between the focal lengths of the first lens component G1 and the second lens component G2. When the lower limit of the condition (3) is exceeded, the optical power of the first lens component G1 is relatively too strong, so that the back focal length is longer than is necessary and spherical aberration markedly inclines toward the over side. When the upper limit of the condition (3) is exceeded, the optical power of the first lens component G1 is relatively too weak, so that it is difficult to correct longitudinal chromatic aberration.

The first to third embodiments have an aspherical surface in at least one of the first and second lens components G1 and G2. It is desirable to provide an aspherical surface in the first lens element G1 and the second lens component G2 in more excellently correct aberrations. For example, an aspherical surface provided in the first lens component G1 is effective, particularly, in correcting spherical aberration and an aspherical surface provided in the second lens component G2 is effective, particularly, in correcting curvature of field and distortion.

It is desirable for the aspherical surface provided in the first lens component G1 to fulfill the following condition (4) and it is desirable for the aspherical surface provided in the second lens component G2 to fulfill the following condition (5):

$$-0.05 < \{|X_Z| - |X_{ZO}|\}/\{C(N'-N)\} < 0.03 \tag{4}$$

$$-0.1 < \{|X_Z| - |X_{ZO}|\}/\{C(N'-N)\} < 0.0 \tag{5}$$

where $X_Z$ represents a displacement amount of a maximum effective optical path aperture expressed by an equation (a) in the direction of the optical axis at a height $Y_M$, $X_{ZO}$ represents a displacement amount of a maximum effective optical path aperture expressed by an equation (b) in the direction of the optical axis at the height $Y_M$, C represents a curvature of a spherical surface serving as a reference of the aspherical surface, N' represents an image side refractive index of the aspherical surface, and N represents an object side refractive index of the aspherical surface.

$$X = X_0 + \Sigma(Aj \cdot Y^j) \tag{a}$$

$$X_0 = (C \cdot Y^2)/\{1 + (1 - \epsilon \cdot C^2 \cdot Y^2)^{1/2}\} \tag{b}$$

where

X represents a displacement amount from a reference surface in the direction of the optical axis, Y represents a height in a direction perpendicular to the optical axis, Aj represents the aspherical coefficient of the j-th order, and $\epsilon$ represents the quadric surface parameter.

When the lower limit of the condition (4) is exceeded, the over tendency of spherical aberration is conspicuous. When the upper limit of the condition (4) is exceeded, the under tendency of spherical aberration is conspicuous. The condition (5) indicates that the aspherical surface has a configuration which always weakens the positive optical power of the second lens component G2. When the lower limit of the condition (5) is exceeded, since distortion is overcorrected, the plus side tendency is conspicuous and spherical aberration is also overcorrected. When the upper limit of the condition (5) is exceeded, since distortion is undercorrected, the minus side tendency is conspicuous and spherical aberration is also undercorrected.

By using a doublet lens as the second lens component G2 like in the first and third embodiments, lateral chromatic aberration is effectively corrected, so that more excellent optical performance is obtained.

Hereinafter, the construction of the fixed focal length lens system embodying the present invention will be more concretely described with reference to construction data and graphic representations of aberrations, etc.

In the construction data shown below, ri (i=1,2,3, . . . ) represents the radius of curvature of an ith surface counted from the object side, di (i=1,2,3, . . . ) represents an ith axial distance counted from the object side, and Ni (i=1,2, 3, . . . ) and vi (i=1,2,3, . . . ) represent the refractive index (Nd) and the Abbe number (vd) to the d-line of an ith lens counted from the object side. The surfaces with their radii of curvature ri being marked with asterisks are aspherical surfaces and the configurations of the aspherical surfaces are expressed by the equations (a) and (b). The focal length f and the F-number FNO of the entire lens system are shown together with the construction data. Values corresponding to the conditions (1) to (5) in the embodiments are shown in Table 1.

FIGS. 4A–4C, 5A–5C, and 6A–6C are graphic representations of aberrations corresponding to the first to third embodiments. In the graphic representations of spherical aberration, the solid line (d) represents aberration to the d-line and the broken line (SC) represents sine condition. In the graphic representations of astigmatism, the solid line (DS) and the broken line (DM) represent astigmatisms in a sagittal pencil of rays and in a meridional pencil of rays, respectively.

TABLE 1

<<Embodiment 1>>
f = 4.1
FNO = 5.6

| Radius of Curvature | Axial Distance | Refractive Index | Abbe Number |
|---|---|---|---|
| r1 = ∞(Aperture Diaphragm S) | | | |
| | d1 = 0.350 | | |
| r2* = 2.544 | | | |
| | d2 = 0.788 | N1 = 1.58400 | ν1 = 31.00 |
| r3* = 1.501 | | | |
| | d3 = 0.631 | | |
| r4 = −11.885 | | | |
| | d4 = 0.500 | N2 = 1.80518 | ν2 = 25.43 |
| r5 = 5.000 | | | |
| | d5 = 1.250 | N3 = 1.75450 | ν3 = 51.57 |
| r6 = −1.988 | | | |

[Aspherical Coefficient]
r2: $\epsilon = 1.0000$
  $A4 = -0.16712 \times 10^{-1}$
  $A6 = -0.76519 \times 10^{-1}$
  $A8 = -0.11569 \times 10^{-4}$
  $A10 = -0.15420 \times 10^{-8}$
r3: $\epsilon = 1.0000$
  $A4 = 0.11568 \times 10^{-1}$
  $A6 = -0.19311 \times 10^{-1}$
  $A8 = 0.30223 \times 10^{-4}$
  $A10 = 0.10039 \times 10^{8}$

TABLE 2

<<Embodiment 2>>
f = 4.1
FNO = 5.6

| Radius of Curvature | Axial Distance | Refractive Index | Abbe Number |
|---|---|---|---|
| r1 = ∞(Aperture Diaphragm S) | | | |
| | d1 = 0.500 | | |
| r2* = 3.083 | | | |
| | d2 = 0.788 | N1 = 1.58400 | ν1 = 31.00 |
| r3 = 1.737 | | | |
| | d3 = 0.631 | | |
| r4 = 13.021 | | | |
| | d4 = 1.390 | N2 = 1.49140 | ν2 = 57.82 |
| r5* = −1.604 | | | |

[Aspherical Coefficient]
r2: $\epsilon = 1.0000$
  $A4 = 0.93066 \times 10^{-2}$
  $A6 = -0.10506$ TABLE 2-continued $A8 = -0.22276 \times 10^{-4}$
  $A10 = -0.18640 \times 10^{-8}$
r5: $\epsilon = 1.0000$
  $A4 = 0.32028 \times 10^{-1}$
  $A6 = -0.25896 \times 10^{-1}$
  $A8 = 0.11487 \times 10^{-1}$
  $A10 = 0.31893 \times 10^{-5}$

TABLE 3

<<Embodiment 3>>
f = 4.1
FNO = 2.8

| Radius of Curvature | Axial Distance | Refractive Index | Abbe Number |
|---|---|---|---|
| r1 = ∞(Aperture Diaphragm S) | | | |
| | d1 = 0.600 | | |
| r2* = 3.453 | | | |
| | d2 = 0.800 | N1 = 1.58400 | ν1 = 31.00 |
| r3* = 2.144 | | | |
| | d3 = 0.800 | | |
| r4 = −9.810 | | | |
| | d4 = 0.500 | N2 = 1.79850 | ν2 = 22.60 |
| r5 = 5.714 | | | |
| | d5 = 1.650 | N3 = 1.75450 | ν3 = 51.57 |
| r6* = −2.165 | | | |

[Aspherical Coefficient]
r2: $\epsilon = 1.0000$
  $A4 = 0.27624 \times 10^{-1}$
  $A6 = -0.25787 \times 10^{-1}$
  $A8 = 0.63226 \times 10^{-4}$
  $A10 = 0.62010 \times 10^{-8}$
r3: $\epsilon = 1.0000$
  $A4 = 0.75020 \times 10^{-1}$
  $A6 = -0.12569 \times 10^{-1}$
  $A8 = 0.83697 \times 10^{-6}$
  $A10 = -0.13242 \times 10^{-8}$
r6: $\epsilon = 1.0000$
  $A4 = 0.35990 \times 10^{-2}$
  $A6 = 0.27125 \times 10^{-4}$
  $A8 = 0.15448 \times 10^{-3}$
  $A10 = -0.14399 \times 10^{-4}$

TABLE 4

| | Cond. (1) $PR_L$ | Cond. (2) | Cond. (3) | Cond. (4) (5) $\{|X_Z| - |X_{Z0}|\}/\{C(N' - N)\}$ | | | |
|---|---|---|---|---|---|---|---|
| | /Y' | Pf/f | Pf/Nf | r2 | r3 | r5 | r6 |
| Emb.1 | 0.220 | 0.740 | −0.349 | −0.00211 | −0.00056 | — | — |
| Emb.2 | 0.242 | 0.732 | −0.345 | −0.00045 | — | −0.09053 | — |
| Emb.3 | 0.124 | 0.823 | −0.270 | 0.02264 | −0.04588 | — | −0.05171 |

<Embodiments 4 to 7>

A fixed focal length lens system embodying the present invention will hereinafter be described with reference to the drawings. FIGS. 7 to 10 are lens construction views corresponding to fixed focal length lens systems according to fourth to seventh embodiments. In the lens construction views, the surfaces marked with ri (i=1,2,3, . . . ) are ith surfaces counted from the object side, and the axial distances marked with di (i=1,2,3, . . . ) are ith axial distances counted from the object side. The surfaces with their ri marked with asterisks are aspherical surfaces. The surfaces with their ri marked with [DOE] are diffractive optical surfaces.

The fourth to seventh embodiments are all two-lens-component fixed focal length lens systems comprising from the object side, an aperture diaphragm A, a first lens component G1 having a comparatively weak optical power and a second lens component G2 having a positive optical power. At least one of the first and second lens components G1 and G2 is a diffractive-refractive hybrid lens in which a diffractive optical element is provided on a surface of a refractive optical element.

In the fourth embodiment (FIG. 7), the first lens component G1 comprises a positive meniscus lens convex to the image side and the second lens components G2 comprises a meniscus lens convex to the object side and having a positive power including a diffractive optical component. In the fifth embodiment (FIG. 8), the first lens component G1 comprises a negative meniscus lens convex to the object side and the second lens element G2 comprises a meniscus lens convex to the image side and having a positive power including a diffractive optical element. In the sixth embodiment (FIG. 9), the first lens element G1 comprises a meniscus lens convex to the object side and having a positive power including a diffractive optical component and the second lens element G2 comprises a meniscus lens convex to the object side and having a positive power including a diffractive optical component. In the seventh embodiment (FIG. 10), the first lens element G1 comprises a meniscus lens convex to the object side and having a positive power including a diffractive optical element and the second lens components G2 comprises a positive meniscus lens element convex to the image side.

When handled by a thin lens system, longitudinal chromatic aberration is given by the following equation (A):

$$L = \phi r/\nu r + \phi d/\nu d \qquad (A)$$

where

L represents longitudinal chromatic aberration,

φr represents the refractive power of a refractive optical element,

νr represents the dispersion value (i.e. Abbe number) of the refractive optical element, φd represents the power of a diffractive optical element, and νd represents the dispersion value (corresponding to the Abbe number) of the diffractive optical element.

νr and νd are expressed by the following equations (B) and (C):

$$\nu r = (Nd-1)/(Nf-Nc) \qquad (B)$$

$$\nu d = \lambda d/(\lambda f - \lambda c) = -3.45 \qquad (C)$$

where

Nd represents the refractive index to the d-line of the refractive optical element on the optical axis of the lens, Nf represents the refractive index to the f-line of the refractive optical element on the optical axis of the lens, Nc represents the refractive index to the c-line of the refractive optical element on the optical axis of the lens, λd represents the wavelength (=587.56 nm) of the d-line, λf represents the wavelength (=486.13 nm) of the f-line, and λc represents the wavelength (=656.28 nm) of the c-line.

As is apparent from the equation (C), the diffractive optical element has a great negative dispersion value (−3.45). By using a refractive optical element and a diffractive optical element in combination with each other, positive φr/νr is offset by negative φd/νd. Consequently, chromatic aberration generated in the refractive optical element is corrected by the diffractive optical element.

When the number of lens components is reduced to two like in the fourth to seventh embodiments, chromatic aberration generated in the refractive optical element increases, so that it is difficult to correct chromatic aberration only by the refractive optical element. However, in the fourth to seventh embodiments, since at least one lens surface in the first and second lens elements G1 and G2 has a diffractive optical element, the chromatic aberration correcting power using characteristics of the diffractive optical element can be given to the refractive optical element. Consequently, chromatic aberration generated in the refractive optical element is effectively corrected by the diffractive optical element. For example, by providing a diffractive optical element on at least one surface of the first lens component G1, longitudinal chromatic aberration is mainly corrected, and by providing a diffractive optical component on at least one surface of the second lens element G2, lateral chromatic aberration is mainly corrected.

The diffractive optical elements used in the fourth to seventh embodiments fulfill the following condition (6) and the first and second lens components G1 and G2 fulfill the following condition (7):

$$0.01 < |\phi r/\phi A| < 0.45 \qquad (6)$$

$$|f2/f1| < 0.6 \qquad (7)$$

where

φA represents the composite optical power of the entire lens system,

φr represents the optical power of diffraction of the surface, f1 represents the focal length of the first lens component G1, and f2 represents the focal length of the second lens component G2.

The condition (6) defines the power φr of the diffractive optical element with respect to the composite power φA of the entire lens system and controls the amount of aberration correction, particularly, spherical aberration correction by the diffractive optical element. When the lower limit of the condition (6) is exceeded, the power of the diffractive optical component is too weak, so that the undercorrection of longitudinal chromatic aberration and lateral chromatic aberration is conspicuous. When the upper limit of the condition (6) is exceeded, the power of the diffractive optical element is too strong, so that the overcorrection of longitudinal chromatic aberration and lateral chromatic aberration is conspicuous.

The condition (7) defines the focal length f1 of the first lens component G1 with respect to the focal length f2 of the second lens component G2 and indicates that the first lens element G1 has a weak power with respect to the second lens element G2. As described previously, the diffractive optical element is provided in at least one of the first and second lens component G1 and G2. Therefore, when no diffractive optical element is provided, the focal lengths f1 and f2 of the lens component G1 and G2 are the inverse of the optical power by the refractive optical element, and when a diffractive optical element is provided, the focal lengths f1 and f2 are the inverse of the sum of the optical power by the refractive optical element and the power to diffract light by the diffractive optical element.

When the upper limit of the condition (7) is exceeded in a case where the focal length f1 of the first lens components G1 is negative, the retrofocus degree increases, so that the back focal length is longer than is necessary to increase the size of the lens system and minus distortion is conspicuous. When the upper limit of the condition (7) is exceeded in a case where the focal length f1 of the first lens components G1 is positive, the inclination of the image plane toward the under side is conspicuous.

In a camera (video camera, etc.) having a solid-state image sensing device, a condensing micro lens is generally provided on the incident surface side of each light receiving element in order to increase the light reception efficiency of the light receiving elements. To increase the condensing capability of the micro lens, it is desirable that the light rays incident on the micro lens should be parallel to the optical axis of the micro lens (that is, it is desirable that the off-axial light rays should be incident on the micro lens in a direction perpendicular to the incident surfaces of the light receiving elements). By situating the exit pupil substantially at infinity and forming the taking lens system so as to be telecentric to the image side, the off-axial light rays is incident on the micro lens in a direction substantially perpendicular to the incident surfaces of the light receiving elements, so that the condensing capability of the micro lens improves. When the distance from the exit pupil of the taking lens system to the image plane decreases, on a micro lens situated in a peripheral portion of an image taken by the solid-state image sensing device, the off-axial light rays are incident in a direction oblique to the incident surfaces of the light receiving elements, so that the condensing capability of the micro lens degrades in the peripheral portion of the image. When the condensing capability degrades in the peripheral portion of the image, there is a difference in brightness between the central portion and the peripheral portion of the image.

When the above-mentioned substantially telecentric construction is applied to a small-size low-cost fixed focal length lens system, the retrofocus type is advantageous. This is because if a lens system has a retrofocus type construction, it is advantageous in situating the exit pupil far away when the back focal length is comparatively long. While the minimum number of lens elements for the retrofocus type is two, i.e. a negative lens component and a positive lens component, when a retrofocus type is formed of two lens components, it is very difficult to correct chromatic aberration (particularly, lateral chromatic aberration). According to the features of the present invention, although the number of lens elements is as small as two like in the fourth to seventh embodiments, aberrations such as chromatic aberration are excellently corrected as mentioned previously, so that high optical performance is achieved which is sufficient for a taking lens system for a camera having a solid-state image sensing device.

It is desirable that the diffractive optical surface comprising the diffractive optical element should be blazed (sawtoothed). By blazing the diffractive optical surface, the diffractive efficiency is improved. Methods for blazing the diffractive optical surface include: a method (binary optics) in which a sawtoothed shape is approximated by a stepped shape by use of a semiconductor manufacture technology, etc.; a method in which a glass or a plastic material is molded with a mold manufactured by precise cutting; and a method in which the diffractive optical surface is molded from a resin layer formed on a glass lens.

In the fourth to seventh embodiments, the lens having the diffractive optical element is made of plastic. It is desirable to form the lens surface having a diffractive optical element by providing the diffractive optical element on a surface of a plastic-made refractive optical element (i.e. plastic lens). When the diffractive optical surface is formed on a plastic lens, the diffractive optical surface can be formed so as to be integral with the surface of the lens by, for example, injection molding. Therefore, forming the diffractive optical surface on a surface of a plastic lens results in a more inexpensive diffractive optical element than forming the diffractive optical surface on a surface of a glass lens, and is effective for the cost reduction of the lens system.

It is desirable to provide the diffractive optical element on a surface of a refractive optical element having an aspherical surface configuration like in the fourth to sixth embodiments. When the base surface of the diffractive optical element is aspherical, not only spherical aberration and coma due to the reduced number of lens components are excellently corrected by the aspherical surface but also advantages are obtained in manufacturing the lens. For example, when the diffractive optical surface is formed by machining, the aspherical surface configuration and the diffractive optical surface configuration can be simultaneously machined, so that the number of manufacture steps is reduced and the accuracy of machining is improved.

Hereinafter, the fixed focal length lens system embodying the present invention will be more concretely described with reference to construction data and graphic representations of aberrations, etc.

In the construction data of the embodiments, ri (i=1,2,3, . . . ) represents the radius of curvature of an ith surface counted from the object side and di (i=1,2,3, . . . ) is an ith axial distance counted from the object side. Ni (i=1,2) and vi (i=1,2) represent the refractive index and the Abbe number to the d-line of an ith lens counted from the object side. The focal length f and the F-number FNO of the entire lens system are shown together with the construction data. Values corresponding to the conditions (6) and (7) in the embodiments are shown in Table 9.

The surface whose radius of curvature ri is marked with an asterisk (*) is an aspherical surface, and its shape is defined by the formula (AS) below.

$$Y = \frac{C \cdot X^2}{1 + (1 - \varepsilon \cdot X^2 \cdot C^2)^{1/2}} + \sum_i Ai \cdot X^i \quad (AS)$$

where

Y represents a displacement along the optical axis from the reference surface,

X represents the height in a direction perpendicular to the optical axis,

C represents the paraxial curvature, $\varepsilon$ represents the quadric surface parameter, and Ai represents the aspherical coefficient of the i-th order.

The surface whose radius of curvature ri is marked with a symbol [DOE] are surfaces where a diffractive optical surface is formed on a refractive optical surface, and the pitch of the diffractive optical surface depends on the phase shape thereof that is defined by formula (DS) below.

$$\phi(X) = (2\pi/\lambda) \cdot \left( \sum_i Ri \cdot X^{2i} \right) \quad \text{(DS)}$$

where $\phi(X)$ represents the phase function of the diffractive optical surface, Ri represents the phase function coefficient of the diffractive optical surface of the i-th order, X represents a height in a direction perpendicular to the optical axis, and $\lambda$ represents the design reference wavelength (=587.56 nm (d-line))

FIGS. 11A–11C, 12A–12C, 13A–13C, and 14A–14C are graphic representations of longitudinal aberrations corresponding to the fourth to seventh embodiments. FIGS. 15A–15E, 16A–16E, 17A–17E, and 18A–18E are graphic representations of lateral aberrations corresponding to the fourth to seventh embodiments. The evaluation of the aberrations shown in FIGS. 11A–11C, 12A–12C, 13A–13C, 14A–14C, 15A–15E, 16A–16E, 17A–17E, and 18A–18E was performed by ue of the primary diffracted light.

In the graphic representations of spherical aberration of FIGS. 11A–11C, 12A–12C, 13A–13C, and 14A–14C, the solid line represents spherical aberration to the d-line, the dash and dotted line represents spherical aberration to the g-line and the broken line represents spherical aberration to the c-line. In the graphic representations of astigmatism, the solid line X represents astigmatism in a sagittal light rays and the solid line Y represents astigmatism in a meridional light rays. The longitudinal axes of the graphic representations of spherical aberration (lateral axes, mm) represent h/h0 which is an incident height h standardized by a maximum height h0. The longitudinal axes of the graphic representations of astigmatism (lateral axes, mm) and distortion (lateral axes, %) represent a half view angle $\omega(°)$ In the graphic representations of lateral aberrations of FIGS. 15A–15E, 16A–16E, 17A–17E, and 18A–18E, X-FAX is a graphic representation of lateral aberration in a sagittal light rays and Y-FAX is a graphic representation of lateral aberration in a meridional light rays. The solid line represents lateral aberration to the d-line. The dash and dotted line represents lateral aberration to the g-line. The broken line represents lateral aberration to the c-line. The graphic representations of lateral aberrations show lateral aberrations at a field height ratio y'/y0' (half view angle $\omega°$) shown as "y'/y0' RELATIVE FIELD HEIGHT ($\omega°$)" in each figure. For example, in FIG. 15A–15E, the field height ratio y'/y0' is, from the top, 1.00, 0.78, 0.56, 0.28 and 0.00 (half view angle $\omega$ is 25.97, 19.94, 14.11, 7.003, 0.000°). The field height ratio y'/y0' is a relative field height obtained by standardizing a field height y' by a maximum field height y0' (i.e. when the maximum field height y0' is 1).

TABLE 5

<<Embodiment 4>>
f = 4.1
FNO = 5.6

| Radius of Curvature | Axial Distance | Refractive Index | Abbe Number |
|---|---|---|---|
| r1 = ∞(Aperuture Diaphragm A) | | | |
| | d1 = 0.550 | | |

TABLE 5-continued

| r2* = −0.894 | | | |
|---|---|---|---|
| | d2 = 0.454 | N1 = 1.49270 | v1 = 57.49 |
| r3 = −0.918 | | | |
| | d3 = 1.177 | | |
| r4 = 2.566 | | | |
| | d4 = 0.603 | N2 = 1.49270 | v2 = 57.49 |
| r5*[DOE]= 7.402 | | | |

[Aspherical Coefficient]
r2:ε = 0.100 × 10
  A4 = −2.70405 × 10⁻¹
  A6 = 4.25560
  A8 = −4.27846 × 10
  A10 = 1.77116 × 10²
  A12 = −2.63327 × 10²
r5:ε = 0.100 × 10
  A4 = −1.62501 × 10⁻²
  A6 = 2.17782 × 10⁻²
  A8 = −6.43649 × 10⁻³
  A10 = 3.83739 × 10⁻⁴
[Phase Function Coefficient Of The Diffractive Optical Surface]
r5: R2 = −1.31834 × 10⁻²
  R4 = 8.36029 × 10⁻³
  R6 = −6.31835 × 10⁻³
  R8 = 1.55990 × 10⁻³

TABLE 6

<<Embodiment 5>>
f = 4.1
FNO = 5.6

| Radius of Curvature | Axial Distance | Refractive Index | Abbe Number |
|---|---|---|---|
| r1 = ∞(Aperuture Diaphragm A) | | | |
| | d1 = 0.300 | | |
| r2* = 1.765 | | | |
| | d2 = 0.300 | N1 = 1.49270 | v1 = 57.49 |
| r3 = 1.577 | | | |
| | d3 = 1.188 | | |
| r4 = 25.131 | | | |
| | d4 = 0.652 | N2 = 1.49270 | v2 = 57.49 |
| r5* [DOE] = −2.110 | | | |

[Aspherical Coefficient]
r2:ε = 0.277
  A4 = −1.58241 × 10⁻²
  A6 = 6.78545 × 10⁻²
  A8 = −1.69623 × 10⁻¹
  A10 = 7.88369 × 10⁻²
r5:ε = 0.100 × 10
  A4 = 3.29187 × 10⁻³
  A6 = −3.07254 × 10⁻³
  A8 = 1.98569 × 10⁻³
  A10 = −3.85535 × 10⁻⁴
[Phase Function Coefficient Of The Diffractive Optical Surface]
r5: R2 = −8.46946 × 10⁻³
  R4 = 5.10070 × 10⁻⁴
  R6 = 2.10931 × 10⁻⁶
  R8 = −1.41853 × 10⁻⁵
  R10 = −1.33746 × 10⁻⁴

TABLE 7

<<Embodiment 6>>
f = 4.1
FNO = 5.6

| Radius of Curvature | Axial Distance | Refractive Index | Abbe Number |
|---|---|---|---|
| r1 = ∞(Aperture Diaphragm A) | | | |
| | d1 = 0.300 | | |
| r2* = 0.897 | | | |
| | d2 = 0.320 | N1 = 1.49270 | v1 = 57.49 |
| r3[DOE] = 0.864 | | | |
| | d3 = 1.409 | | |
| r4 = 2.709 | | | |
| | d4 = 0.815 | N2 = 1.49270 | v2 = 57.49 |

TABLE 7-continued r5*[DOE] = −10.251
[Aspherical Coefficient]
r2:ε = 0.719
    A4 = 1.05737 × 10$^{-2}$
    A6 = 1.92828 × 10$^{-1}$
    A8 = −8.97243 × 10$^{-1}$
    A10 = 5.86997 × 10$^{-1}$
r5:ε = 0.100 × 10
    A4 = 1.39509 × 10$^{-2}$
    A6 = −4.07198 × 10$^{-3}$
    A8 = 2.94653 × 10$^{-3}$
    A10 = −6.70439 × 10$^{-4}$
[Phase Function Coefficient Of The Diffractive Optical Surface]
r3: R2 = −7.09875 × 10$^{-3}$
    R4 = 7.16763 × 10$^{-3}$
    R6 = −3.49850 × 10$^{-3}$
    R8 = −4.14464 × 10$^{-2}$
    R10 = −4.74011 × 10$^{-1}$
r5: R2 = −4.94366 × 10$^{-3}$
    R4 = 1.95843 × 10$^{-4}$
    R6 = −1.02232 × 10$^{-3}$
    R8 = 5.23693 × 10$^{-4}$
    R10 = −8.06184 × 10$^{-5}$

TABLE 8

<<Embodiment 7>>
f = 4.1
FNO = 5.6

| Radius of Curvature | Axial Distance | Refractive Index | Abbe Number |
|---|---|---|---|
| r1 = ∞(Aperture Diaphragm A) | | | |
| | d1 = 0.300 | | |
| r2* = 2.203 | | | |
| | d2 = 1.070 | N1 = 1.49270 | ν1 = 57.49 |
| r3[DOE]= 1.902 | | | |
| | d3 = 0.910 | | |
| r4 = 6.836 | | | |
| | d4 = 0.795 | N2 = 1.49270 | ν2 = 57.49 |
| r5* = −2.447 | | | |

[Aspherical Coefficient]
r2:ε = 0.893
    A4 = −1.23772 × 10$^{-2}$
    A6 = 3.71824 × 10$^{-2}$
    A8 = −1.26091 × 10$^{-1}$
    A10 = 2.54211 × 10$^{-1}$
r5:ε = 0.100 × 10
    A4 = 6.35074 × 10$^{-3}$
    A6 = −4.19462 × 10$^{-3}$
    A8 = 1.58429 × 10$^{-3}$
    A10 = −3.62308 × 10$^{-4}$
[Phase Function Coefficient Of The Diffractive Optical Surface]
r3: R2 = −1.56284 × 10$^{-2}$
    R4 = 4.85402 × 10$^{-3}$
    R6 = 2.71395 × 10$^{-3}$
    R8 = −7.87086 × 10$^{-3}$
    R10 = 7.54412 × 10$^{-3}$

TABLE 9

| | | Cond.(6) $|\phi r/\phi A|$ | Cond.(7) $|f2/f1|$ |
|---|---|---|---|
| Emb.4 | r5 | 0.108 | 0.488 |
| Emb.5 | r5 | 0.069 | 0.058 |
| Emb.6 | r3 | 0.058 | 0.250 |
| | r5 | 0.040 | |
| Emb.7 | r3 | 0.128 | 0.122 |

What is claimed is:

1. A lens system comprising, from the object side: a first lens component having a negative optical power; and a second lens component having a positive optical power, wherein said lens system fulfills the following conditions:

$$0.0 < PR_L/Y' < 0.5$$

$$0.5 < Pf/f < 1.0$$

where $PR_L$ represents a distance in a direction perpendicular to the optical axis between the optical axis and an incident position where a lower ray of a most off-axial ray enters the second lens component, Y' represents a largest image height, f represents a focal length of the entire lens system, and Pf represents a focal length of the second lens component; and said lens system including no other lens components than said first lens component and said second lens component.

2. A lens system as claimed in claim 1, wherein said second lens component is a doublet lens consisting of two lens components cemented together.

3. A lens system as claimed in claim 1, wherein said first lens component has an aspherical surface.

4. A lens system as claimed in claim 1, wherein said second lens component has an aspherical surface.

5. A lens system as claimed in claim 1, further comprising:

a diaphragm provided at the object-side end of the lens system.

6. A lens system as claimed in claim 1 wherein $$-0.6 < Pf/Nf < -0.1$$

where

Nf represents the focal length of the first lens component G1.

7. A lens system as claimed in claim 1 wherein $$-0.05 < \{|X_Z|-|X_{ZO}|\}\{C(N'-N)\} < 0.03$$

$$-0.1 < \{|X_Z|31\ |X_{ZO}|\}/\{C(N'-N)\} < 0.00$$

where $X_Z$ represents a displacement amount of a maximum effective optical path aperture expressed by an equation (a) in the direction of the optical axis at a height $Y_M$, $X_{ZO}$ represents a displacement amount of a maximum effective optical path aperture expressed by an equation (b) in the direction of the optical axis at the height $Y_M$, C represents a curvature of a spherical surface serving as a reference of the aspherical surface, N' represents an image side refractive index of the aspherical surface, and N represents an object side refractive index of the aspherical surface.

$$X = X_0 + \Sigma(Aj \cdot Y^j) \qquad (a)$$

$$X_0 = (C \cdot Y^2)/\{1 + (1 - \epsilon \cdot C^2 \cdot Y^2)^{1/2}\} \qquad (b)$$

where

X represents a displacement amount from a reference surface in the direction of the optical axis, Y represents a height in a direction perpendicular to the optical axis, Aj represents the aspherical coefficient of the j-th order, and ε represents the quadric surface parameter.

8. A fixed focal length lens system comprising from the object side:

a first lens component having a negative optical power, said first lens component being a meniscus lens element convex to the object side; and a second lens component having a positive optical power, said second lens component being a bi-convex lens element, wherein said fixed focal length lens system fulfills the following conditions:

$$0.0 < PR_L/Y' < 0.5$$

$$0.5 < Pf/f < 1.0$$

where $PR_L$ represents a distance in a direction perpendicular to the optical axis between the optical axis and an incident position where a lower ray of a most off-axial ray enters the second lens component, Y' represents a largest image height, f represents a focal length of the entire lens system, and Pf represents a focal length of the second lens component, said fixed focal length lens system having no other lens components other than the first lens component and the second lens component.

9. A fixed focal length lens system as claimed in claim 8, wherein said second lens component is a single lens element.

10. A fixed focal length lens system as claimed in claim 8, where said second lens component is a cemented lens component consisting of a negative lens element and a positive lens element.

11. A fixed focal length lens system a claimed in claim 8, wherein said first lens component has at least one aspherical surface.

12. A fixed focal length lens system as claimed in claim 8, wherein said second lens component has at least one aspherical surface.

13. A fixed focal length lens system as claimed in claim 8, wherein said first lens component has two aspherical surfaces.

14. A fixed focal length lens system as claimed in claim 8, wherein said first lens component has an aspherical surface at the most object side surface.

15. A fixed focal length lens system as claimed in claim 8, wherein a diaphragm is provided at the object side end of the lens system.

16. A lens system for focusing an image on a solid-state image sensing device, comprising, from the object side;

a first lens component having a negative optical power; and a second lens component having a positive optical power wherein said lens system fulfills the following conditions:

$$0.0 < PR_L/Y' < 0.5$$

$$0.5 < Pf/f < 1.0$$

where $PR_L$ represents a distance in a direction perpendicular to the optical axis between the optical axis and an incident position where a lower ray of a most off-axial ray enters the second lens component, Y' represents a largest image height, f represents a focal length of the entire lens system, and Pf represents a focal length of the second lens component; and said lens system including no other lens elements than said first lens element and said second lens element.

* * * * *

UNITED STATES PATENT AND TRADEMARK OFFICE
CERTIFICATE OF CORRECTION

PATENT NO. : 5,999,334
DATED : December 7, 1999
INVENTOR(S) : Tetsuo Kohno

It is certified that error appears in the above-identified patent and that said Letters Patent is hereby corrected as shown below:

Front Page [75], Inventor: after "Tetsuo Kohno," delete "Toyonaka" and insert -- Toyonaka-Shi --.

Column 16,
Line 42, delete "$-0.1 < \{ |X_z| \ 31 \ |X_{20}| \} / \{ C(N'-N) \} < 0.00$", and insert -- $-0.1 < \{ |X_2| - |X_{20}| \} / \{ C(N'-N) \} < 0.00$ --.

Column 17,
Line 15, delete "$0.5<Pf/f<1.0$", and insert -- $-0.5<Pf/f<1.0$ --.

Column 18,
Line 23, delete "$0.5<Pf/f<1.0$", and insert -- $0.5<Pf/f<1.0$ --.

Signed and Sealed this

Seventh Day of August, 2001

*Attest:*

NICHOLAS P. GODICI
*Attesting Officer*     *Acting Director of the United States Patent and Trademark Office*

UNITED STATES PATENT AND TRADEMARK OFFICE
CERTIFICATE OF CORRECTION

PATENT NO. : 5,999,334
DATED : December 7, 1999
INVENTOR(S) : Tetsuo Kohno

It is certified that error appears in the above-identified patent and that said Letters Patent is hereby corrected as shown below:

Title page,
Item [75], Inventor: after "Tetsuo Kohno," delete "Toyonaka" and insert
-- Toyonaka-Shi --.

Column 16,
Line 42, delete

"$-0.1 < \{|X_z| \; 31 \; |X_{zd}|\} / \{C(N'-N)\} < 0.00$", and insert
-- $-0.1 < \{|X_z| - |X_{zd}|\} / \{C(N'-N)\} < 0.00$ --.

Column 17,
Line 15, delete "$0.5<Pf/ f <1.0$", and insert -- $0.5<Pf/f<1.0$ --.

Column 18,
Line 23, delete "$0.5<Pf/ f <1.0$", and insert -- $0.5<Pf/f<1.0$ --.

This certificate supercedes Certificate of Correction issued August 7, 2001.

Signed and Sealed this

Eighth Day of January, 2002

*Attest:*

JAMES E. ROGAN
*Attesting Officer*   *Director of the United States Patent and Trademark Office*